United States Patent
Song et al.

(10) Patent No.: US 9,747,673 B2
(45) Date of Patent: Aug. 29, 2017

(54) SYSTEMS AND METHODS FOR RECTIFYING IMAGE ARTIFACTS

(71) Applicant: Dolby Laboratories Licensing Corporation, San Francisco, CA (US)

(72) Inventors: Qing Song, San Diego, CA (US); Guan-Ming Su, Fremont, CA (US); Qian Chen, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 14 days.

(21) Appl. No.: 14/929,587

(22) Filed: Nov. 2, 2015

(65) Prior Publication Data
US 2016/0125579 A1 May 5, 2016

Related U.S. Application Data

(60) Provisional application No. 62/075,700, filed on Nov. 5, 2014.

(51) Int. Cl.
*G06T 5/00* (2006.01)
*G06T 5/20* (2006.01)
(Continued)

(52) U.S. Cl.
CPC .............. *G06T 5/008* (2013.01); *G06T 5/002* (2013.01); *G06T 5/20* (2013.01); *H04N 19/117* (2014.11);
(Continued)

(58) Field of Classification Search
CPC ........... G06T 5/002; G06T 5/008; G06T 5/20; G06T 2207/10016; G06T 2207/20012; G06T 2207/20208
See application file for complete search history.

(56) References Cited

U.S. PATENT DOCUMENTS 6,360,024 B1 * 3/2002 Tan ........................ H04N 19/86
358/1.15
7,742,532 B2 6/2010 Jeon
(Continued)

FOREIGN PATENT DOCUMENTS

CN 102081795 6/2011
EP 2109321 10/2009
(Continued)

OTHER PUBLICATIONS

Muneyasu et al. ("Edge-preserving smoothing using median FIR hybrid filters," Proc. SPIE 2424, Nonlinear Image Processing VI, 509, Mar. 28, 1995).*

(Continued)

*Primary Examiner* — Yubin Hung

(57) ABSTRACT

A sparse FIR filter can be used to process an image in order to rectify imaging artifacts. In a first example application, the sparse FIR filter is applied as a selective sparse FIR filter that examines a set of selected neighboring pixels of an original pixel in order to identify smooth areas of the image and to selectively apply filtering to only the smooth areas of the image. The parameters of selective filtering are selected based on the characteristics of an inter-layer predictor. In a second example application, the sparse FIR filter is applied as an edge aware selective sparse FIR filter that examines additional neighboring pixels to the set of selected pixels in order to identify edges and carry out selective filtering of smooth areas of the image. Examples for detecting and removing banding artifacts during the coding of high-dynamic range images are provided.

21 Claims, 16 Drawing Sheets

(51) Int. Cl.
*H04N 19/30* (2014.01)
*H04N 19/117* (2014.01)
*H04N 19/154* (2014.01)
*H04N 19/182* (2014.01)

(52) U.S. Cl.
CPC ......... *H04N 19/154* (2014.11); *H04N 19/182* (2014.11); *H04N 19/30* (2014.11); *G06T 2207/10016* (2013.01); *G06T 2207/20012* (2013.01); *G06T 2207/20208* (2013.01)

(56) References Cited

U.S. PATENT DOCUMENTS

| | | | |
|---|---|---|---|
| 8,620,073 | B2 | 12/2013 | Tuzel |
| 8,731,323 | B2 | 5/2014 | Wang |
| 8,750,390 | B2 | 6/2014 | Sun |
| 8,781,244 | B2 | 7/2014 | Schoenblum |
| 8,787,443 | B2 | 7/2014 | Sun |
| 8,811,490 | B2 | 8/2014 | Su |
| 2003/0063802 | A1* | 4/2003 | Li ............... G06T 7/11 382/199 |
| 2005/0147319 | A1* | 7/2005 | Deshpande ....... H04N 19/60 382/268 |
| 2006/0056723 | A1* | 3/2006 | Pan ............. H04N 19/60 382/268 |
| 2007/0286515 | A1* | 12/2007 | Kim ............ H04N 19/117 382/254 |
| 2009/0257664 | A1* | 10/2009 | Kao ............ H04N 19/159 382/232 |
| 2010/0066912 | A1* | 3/2010 | Kumwilaisak ..... H04N 19/154 348/607 |
| 2010/0134496 | A1 | 6/2010 | Bhaskaran |
| 2010/0246992 | A1* | 9/2010 | Kempf .......... H04N 7/0115 382/262 |
| 2010/0272191 | A1 | 10/2010 | Dorea |
| 2011/0129020 | A1 | 6/2011 | Li |
| 2011/0194618 | A1* | 8/2011 | Gish ............ G06T 5/50 375/240.25 |
| 2011/0222597 | A1 | 9/2011 | Xu |
| 2012/0218442 | A1* | 8/2012 | Jandhyala ....... G06T 7/20 348/239 |
| 2013/0128122 | A1* | 5/2013 | Wang .......... H04N 19/86 348/607 |
| 2013/0148029 | A1 | 6/2013 | Gish |
| 2013/0148907 | A1* | 6/2013 | Su ............. G06T 9/004 382/238 |
| 2015/0092847 | A1 | 4/2015 | Su |
| 2015/0117793 | A1* | 4/2015 | Deng ........... G06T 5/20 382/261 |

FOREIGN PATENT DOCUMENTS

| | | |
|---|---|---|
| EP | 2603000 | 6/2013 |
| WO | 2010/105036 | 9/2010 |
| WO | 2013/064661 | 5/2013 |

OTHER PUBLICATIONS

Yang et al. ("Design of sparse FIR filters based on reweighted l1—norm minimization," IEEE Int'l Conf. on Digital Signal Processing, Jul. 21-24, 2015).*

Lee, Ji Won et al "Two-Stage False Contour Detection Using Directional Contrast and its Application to Adaptive False Contour Reduction" IEEE Transactions on Consumer Electronics, vol. 52, No. 1, Feb. 1, 2006, pp. 179-188.

Wonseok, Ahn et al "Flat-Region Detection and False Contour Removal in the Digital TV Display" IEEE International Conference on Multimedia and Expo, Jul. 6, 2005, pp. 1338-1341.

Young, et al "Image Processing Fundamentals Passage" Internet Citation, 1999.

Yu, H. et al "Compressed Image Restoration Based on Edge Enhancement Field of Experts" Proc. of SPIE, Visual Communications and Image Processing, vol. 7744, Aug. 5, 2010.

Lopez-Rubio, E. et al "An Adaptive System for Compressed Video Deblocking" Elsevier, Signal Processing, vol. 103, Oct. 2014, pp. 415-425.

Smith, M. et al "Thinning the Impulse Response of FIR Digital Filters" IEEE International Conference on Acoustics, Speech, and Signal Processing, Mar. 30-Apr. 1, 1981, pp. 240-242.

Neuvo, Y. et al. "Interpolated Finite Impulse Response Filters" IEEE Transactions on Acoustics, Speech, and Signal Processing, vol. 32, Issue 3, Jun. 1984, pp. 563-570.

* cited by examiner

SYSTEMS AND METHODS FOR RECTIFYING IMAGE ARTIFACTS

CROSS REFERENCE TO RELATED APPLICATIONS

This application claims the benefit of priority to U.S. Provisional Patent Application Ser. No. 62/075,700, filed on Nov. 5, 2014, which is hereby incorporated herein by reference in its entirety.

TECHNICAL FIELD

The present disclosure relates to images. More particularly, it relates to systems and methods for rectifying image artifacts.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

Figure 1:
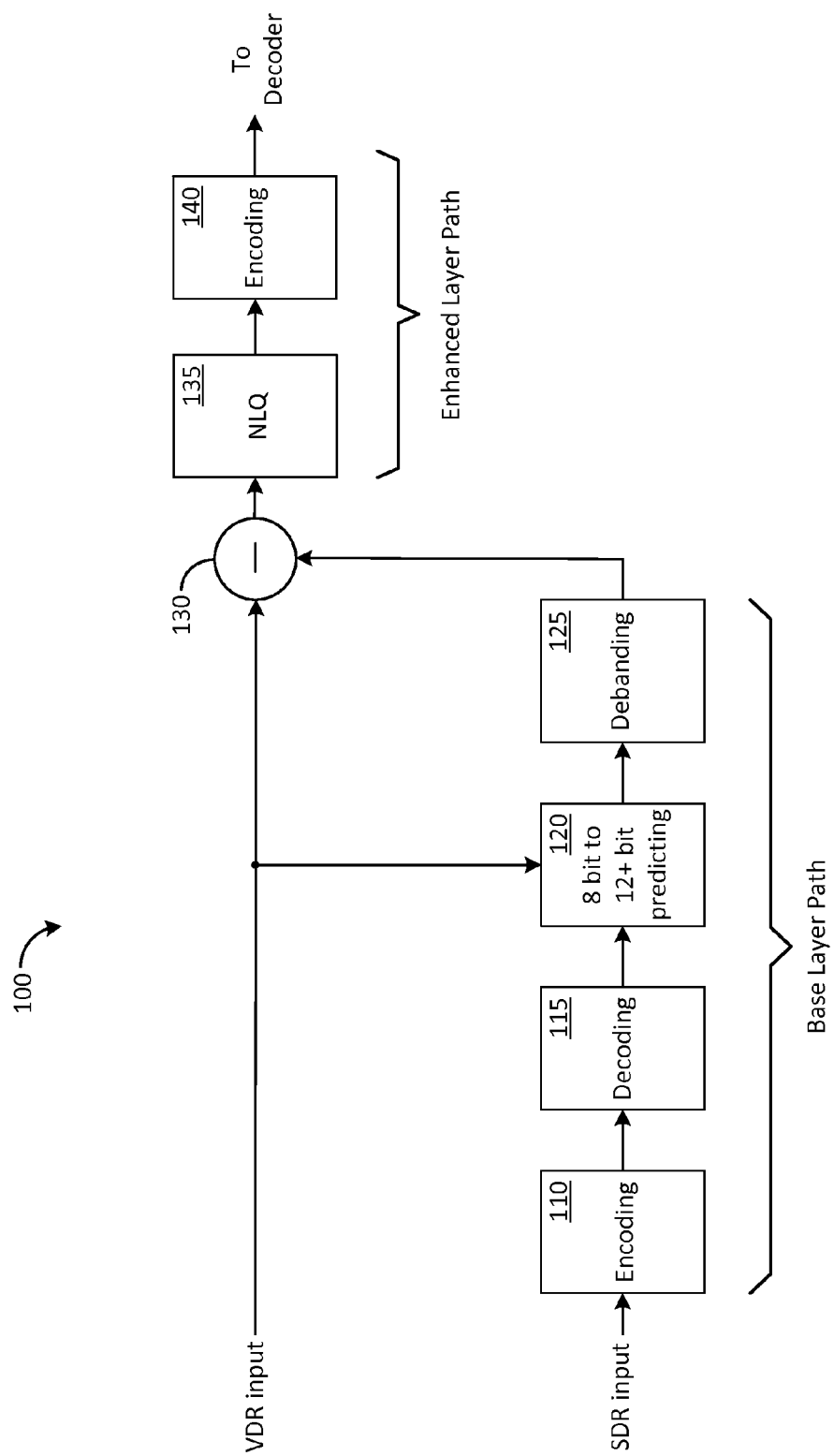
FIG. 1 shows an encoder in accordance with the disclosure.

In a first aspect of the disclosure, a method to reduce visual artifacts is described, the method comprising: providing, by a computer, a first image with a first dynamic range; predicting, by a computer, using a predictor and the first image, a second image with a second dynamic range, wherein the second dynamic range is higher than the first dynamic range; calculating, by a computer, parameters for a debanding filter based on the predictor; and applying, by a computer, the debanding filter to the second image to generate an output image with the second dynamic range.

In a second aspect of the disclosure, a method to reduce visual artifacts is described, the method comprising: providing, by a computer, an enhancement layer signal; providing, by a computer, a first image with a first dynamic range; predicting, by a computer, using a predictor and the first image, a second image with a second dynamic range, wherein the second dynamic range is higher than the first dynamic range; calculating, by a computer, parameters for a debanding filter based on the predictor; applying, by a computer, the debanding filter to the second image to generate an output image with the second dynamic range; and calculating, by a computer, a sum of the output image and the enhancement layer signal, thereby obtaining a decoded image with the second dynamic range.

DETAILED DESCRIPTION

The systems and methods described herein are generally directed to minimizing or eliminating certain types of artifacts that may be present in visual images such as for example a video frame that is a part of a video stream, or a static visual image. It should be understood that the types of artifacts that are addressed herein, namely banding artifacts and coding artifacts, are merely examples that are used for purposes of description and the disclosed systems and methods may be advantageously applied to various other types of artifacts as well. More particularly, in accordance with the disclosure, certain imaging artifacts may be minimized or eliminated by selectively applying sparse finite impulse response (FIR) filtering techniques to areas of an image that contain banding and/or coding artifacts, while preserving edges and image details of objects that may be present elsewhere in the image. The selective application procedure is facilitated by the fact that edges of objects in the image can be identified based on the characteristic that various adjoining pixels have distinctly different luma/chroma values. On the other hand, areas of the image that do not include edges can be identified based on the characteristic that various adjoining pixels have similar luma/chroma values. Such areas, which are generally referred to herein as smooth areas, are typically the areas in which banding and/or coding artifacts can be present. The sparse FIR filtering techniques can be applied to these areas in order to minimize or eliminate banding and/or coding artifacts. Applying the sparse FIR filtering techniques to smooth areas with no banding or coding artifacts merely results in further smoothing of these areas with no significant loss of detail.

The selective application of the sparse FIR filter to an image can be initiated by defining a threshold detection parameter based on a difference in luma/chroma values. As can be understood, setting the threshold detection parameter based on a high level of difference in luma/chroma values will result in less filtering of various areas of the image, and vice-versa. The sparse FIR filter is selectively applied only to smooth areas of the image. This is done by applying the sparse FIR filter only when the luma/chroma value difference between neighboring pixels is below the threshold detection parameter (thereby indicating a predefined degree of similarity between these neighboring pixels). The sparse FIR filter is not applied when the luma/chroma value difference between neighboring pixels is above the threshold detection parameter (thereby showing a lack of similarity between these neighboring pixels indicative of an edge, for example). These and other aspects of the disclosure will now be described in further detail.

The phrase "banding artifact" can be generally understood as pertaining to an artifact that is characterized by an undesirable conversion of a continuous gradation of color tone in an area of an image into multiple distinctly visible regions of fewer color tones. The banding artifact may occur when processing of the color depth (sometimes called bit depth) is insufficient to accurately sample the continuous gradation of color tone. As a result, a continuous gradient appears as a series of discrete steps or bands of color. For example, a banding artifact may be created when processing is directed at converting digital data that conforms to a standard dynamic range (SDR) into an enhanced dynamic range. The enhanced dynamic range, which can be referred to as visual dynamic range (VDR) in some instances, is expanded relative to the SDR in order to provide better quality images to the human eye, which is capable of perceiving great variations of brightness in images. In such processing, a banding artifact may be created when a codec executes a mapping from a low bit depth (for example, 8 bit depth) SDR format to a high bit depth (for example, 12 bit depth) VDR format.

Even if the mapping was perfect, the banding artifact may not be necessarily limited to only the luma components of the image but may extend to chroma components as well. This is because luma and/or chroma values may change gradually in smooth luma/chroma areas. Some prior art codecs may employ an enhancement layer (EL) to address certain mapping errors. However, this approach fails to prevent residual artifacts from appearing in the mapped digital data, especially when the input data rate is relatively low.

In one exemplary embodiment in accordance with the disclosure, rather than operating upon digital data having an original VDR format, an encoder can be configured to apply a coding algorithm to digital data having a predicted VDR format. The digital data having the predicted VDR format may be provided by a base layer application and the coding algorithm can include a sparse FIR filter in accordance with the disclosure. Metadata pertaining to the coding procedure using the sparse FIR filter can be transmitted to a decoder along with the encoded digital data. The metadata can be limited to parameters of the sparse FIR filter used for the encoding. A decoder can be configured to apply a corresponding algorithm to recover the predicted VDR from the encoded signal without necessitating use of the original VDR format.

Attention is now drawn to FIG. 1, which shows an encoder 100 in accordance with the disclosure. The encoder 100 is configured to receive data corresponding to two images. Data corresponding to the first image is referred to herein as original VDR data and data corresponding to the second image is referred to herein as an SDR data. The SDR data is propagated through a base layer path that includes several processing modules, such as for example an encoder module 110, a decoder module 115 and a predictor module 120. In one exemplary embodiment each of the encoder module 110 and the decoder module 115 may conform to the Advanced Video Coding (AVC) standards or other codecs such as High Efficiency Video Coding (HEVC). The predictor module 120 is also provided with the original VDR data so as to allow the predictor module 120 to generate predicted VDR data.

In various embodiments, a debanding procedure may be performed after the predictor module 120 has predicted the image. The debanding procedure can be performed both on the encoder and the decoder. The predictor module 120 can use a sparse filter in accordance with the disclosure to reduce the amount of metadata that is to be signaled from the encoder 100 to a decoder 200 (described below in further detail). The threshold that is used to select whether to apply a sparse filter or not can be computed based on the characteristics of the predictor module 120. Certain edge-detection thresholds may be suitable selected based on the output of the predictor module 120.

In the exemplary embodiment shown in FIG. 1, the predicted VDR data output by the predictor module 120 is processed by a debanding module 125 that can incorporate hardware, software, or both, to execute an in-loop enhancement algorithm using the sparse FIR filter in accordance with the disclosure. The output of the debanding module 125 may be referred to as debanded VDR data.

The debanded VDR data is provided to a difference module 130. The difference module 130 produces difference data derived from a difference between the original VDR data and the debanded VDR data. The difference data is propagated through an enhancement layer path that includes several processing modules such as for example an NLQ (non-linear quantizer) module 135 and an encoder module 140. The output of the enhancement layer path can then be transmitted from the encoder 100 to the decoder 200. Also propagated to the decoder 200 is metadata pertaining to the debanding procedure executed in the debanding module 125. In one exemplary embodiment, the metadata is transmitted to the decoder 200 in-band along with the encoded difference data. Advantageously, the metadata can be limited to parameters of the sparse FIR filter in accordance with the disclosure.

Figure 2:
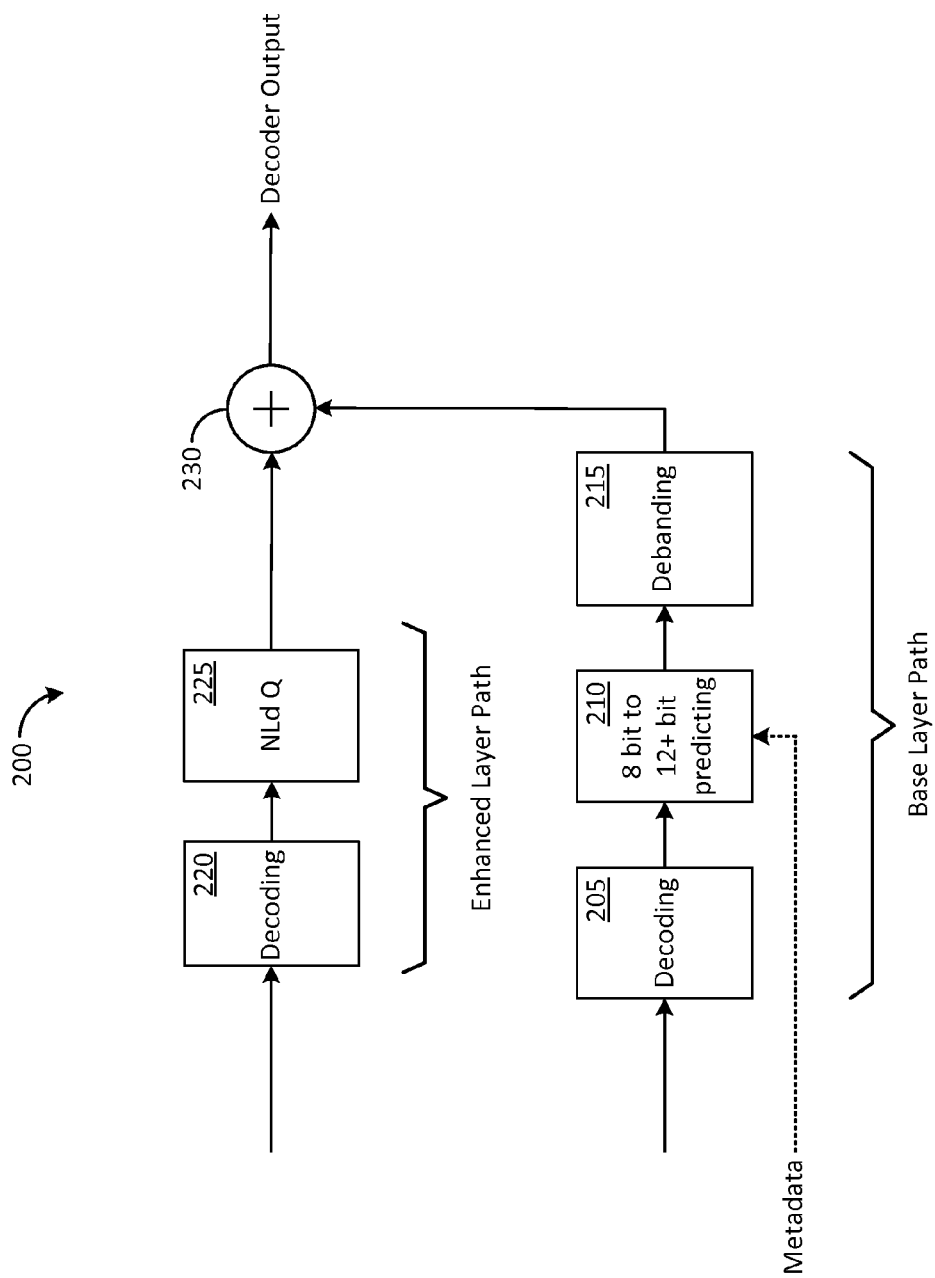
FIG. 2 shows a decoder in accordance with the disclosure.

FIG. 2 shows the decoder 200 in accordance with the disclosure. The decoder 200 is configured to receive the encoded difference data and the metadata transmitted by the encoder 100. The decoder 200 includes an enhancement layer path and a base layer path. The enhancement layer path can include various modules, such as for example, a decoder 220 and nonlinear de-quantizer NLdQ module 225 which reverses the operation of any non-linear quantization in the encoder (e.g., NLQ 135). The base layer path can include a decoder 205 and a predictor module 210. The predictor module 210 uses the metadata to reconstruct, in cooperation with the debanding module 215, the predicted VDR data that was generated in the encoder 100. The reconstructed debanded VDR data is provided by the debanding module 215 to a summer module 230. The summer module 230 produces summed data derived from summing the reconstructed debanded VDR data with the decoded difference data in order to generate the original VDR data.

It should be understood that the various systems and methods disclosed herein can be used to not only address banding artifacts in images, but can also be used to reduce other video coding artifacts. The sparse filter can be applied selectively to preserve true edges and details. In some embodiments, the sparse filter can be applied preferentially to relatively smooth areas, since smooth areas can have banding artifacts. Even in the absence of banding artifacts, smoothing smooth areas does not generally lead to an undesirable level of loss of detail. Though unsmooth areas can include edges or texture, such areas typically do not contain banding artifacts. The algorithm used in the debanding module 215 of the decoder 200 can advantageously use the predicted VDR instead of the original VDR as its input, because in many cases, a decoder may not have access to the original VDR.

Figure 3:
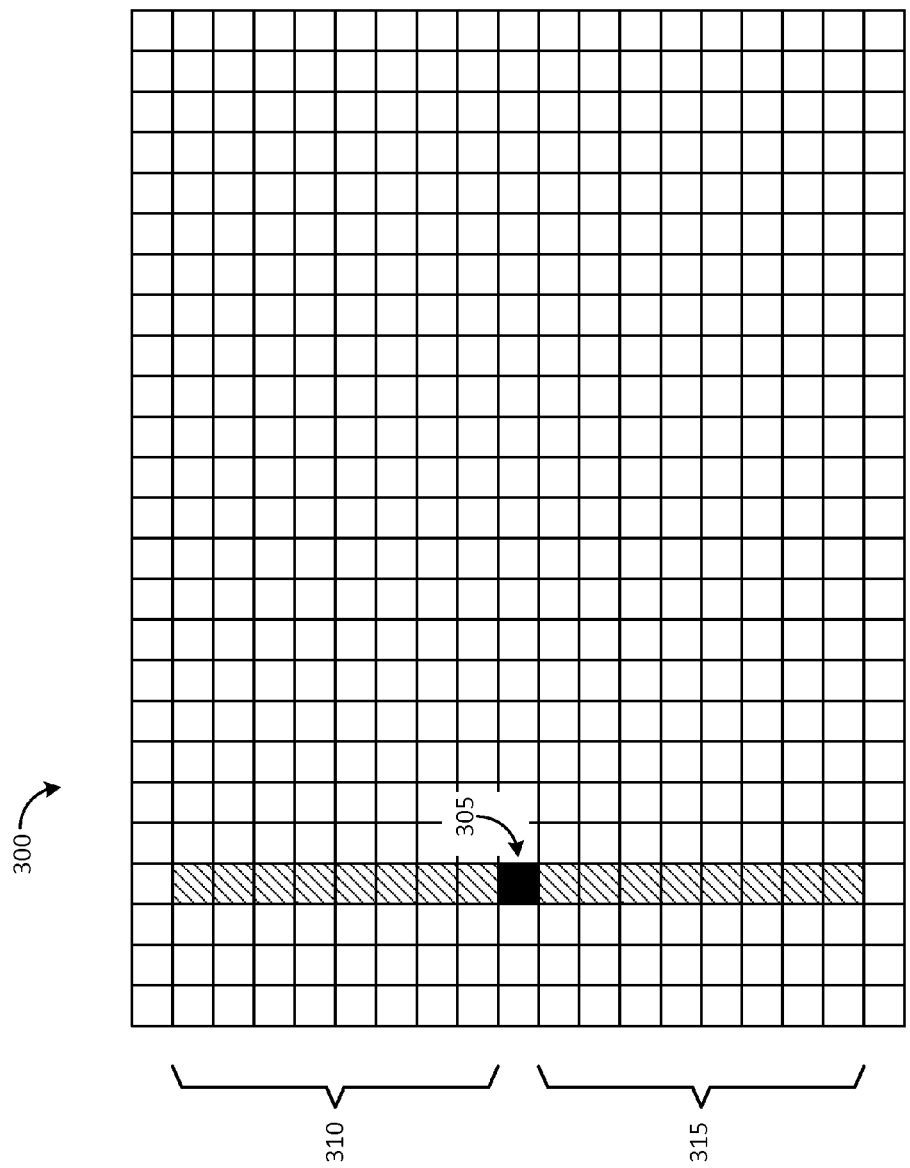
FIG. 3 shows a pixel map of a prior art vertical 17-tap dense filter.

Attention is next drawn to FIG. 3, which shows a pixel map 300 of a prior art vertical 17-tap dense filter. The description associated with the prior art vertical 17-tap dense filter is provided herein in order to differentiate such prior art practice from various inventive aspects that are disclosed herein in accordance with the disclosure.

The prior art dense FIR filter may be characterized by the following equation:

$$y[n] = \sum_{i=-u}^{u} w_i x[n+i]$$

where y[n] is an output signal, and $w_i$ is the $i^{th}$ filter coefficient. The number of taps is 2u+1, which is also the span (length) of the filter. If x[n] includes a pixel 305 of interest, the prior art dense FIR filter extracts all 16 neighbors of x[n], specifically eight neighbors 310 above and eight neighbors 315 below x[n]. The output y[n] is the weighted sum of these 17 pixels, 310 and 315. The x[n+i] terms can be referred to as taps. The number of taps can be an indication of 1) the amount of memory required to implement the filter, 2) the number of calculations required, and 3) the amount of "filtering" that the prior art dense FIR filter can accomplish.

If $$w_i = \frac{1}{\text{number of taps}}$$

for all i, the prior art dense FIR filter can be interpreted as a low pass filter. In general it can be understood that if the prior art dense FIR filter has more taps, more inputs are involved in the averaging, and the output signal is smoother.

For two dimensional (2D) images, the prior art dense FIR filter can be a 2D filter characterized by the following equation:

$$y[m,n] = \sum_{i=-u}^{u} \sum_{j=-v}^{v} w_{i,j} [m+i, n+j]$$

A low pass (averaging) filter with equal weight (coefficient) is shown in Table 1, below wherein $w_{i,j} = \frac{1}{9}$.

TABLE 1

| | | |
|---|---|---|
| $\frac{1}{9}$ | $\frac{1}{9}$ | $\frac{1}{9}$ |
| $\frac{1}{9}$ | $\frac{1}{9}$ | $\frac{1}{9}$ |
| $\frac{1}{9}$ | $\frac{1}{9}$ | $\frac{1}{9}$ |

It can be noted that the output of the filtering is the convolution of an input image and the filter:

$$y[m,n] = x[m,n] * f[m,n]$$

where * indicates convolution.

The filter with equal weight ⅑ shown in Table 1 is actually the convolution of two 1D filters. The first filter can be characterized as A[m,n] that is shown below in Table 2.

TABLE 2

| | | |
|---|---|---|
| $\frac{1}{3}$ | $\frac{1}{3}$ | $\frac{1}{3}$ |

The second filter can be characterized as B[m,n] that is shown below in Table 3.

TABLE 3

| |
|---|
| $\frac{1}{3}$ |
| $\frac{1}{3}$ |
| $\frac{1}{3}$ |

The 2D filter can be characterized as:

$$f[m,n] = A[m,n] * B[m,n]$$

and the output of the 2D filter can be characterized as:

$$y[m,n] = x[m,n] * f[m,n] = x[m,n] * (A[m,n] * B[m,n])$$

Since convolution is associative, A*(B*C)=(A*B)*C, so $$y[m,n] = x[m,n] * (A[m,n] * B[m,n]) = (x[m,n] * A[m,n]) * B[m,n]$$

In other words, convolution with a 2D filter is equivalent to convolution with two 1D filters sequentially. In general, convolution with 1D filters would be more computational efficient than convolution with a 2D filter. Therefore, it may be preferable to filter a 2D image with a vertical filter rather than with a horizontal filter, as long as the 2D filter can be characterized as a convolution of the vertical filter and the horizontal filter.

Typically, the vertical filter and the horizontal 1D filter are not necessarily the same, but in the following description, the same 1D filter is used as an example, and the equivalent 2D filter is the convolution of the two 1D filters (vertical 1D and horizontal 1D). If the 1D filter is symmetric, the 2D filter is also symmetric. For simplicity, the 1D filter is only defined in the following for image filtering. The filtering process comprises applying the 1D filter vertically and then applying the same 1D filter horizontally.

In some embodiments, a dense FIR filter with a different number of filter taps may be applied to a frame or image, for example with 9, 19, and 29 filter taps. Other number of taps may be used. In general, increasing the number of filter taps results in improved filtering at the cost of increased hardware and processing costs. Notwithstanding the number of filter taps used, prior art dense FIR filters typically do not eliminate banding artifacts to a desirable extent and it is therefore desirable to provide filtering solutions that provide improved results at acceptable costs.

Figure 4:
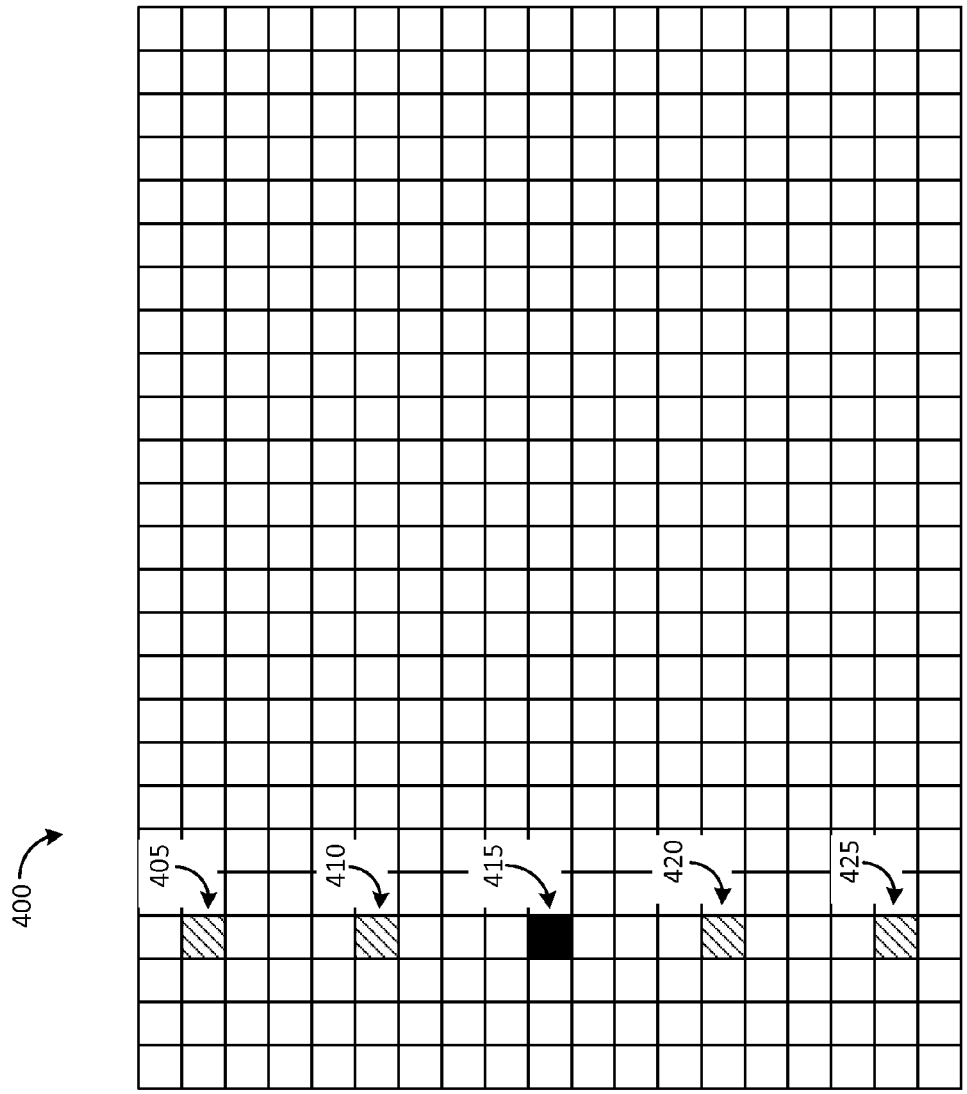
FIG. 4 shows a pixel map of a sparse FIR filter in accordance with the disclosure.

Towards this end, attention is next drawn to FIG. 4, which shows a pixel map 400 of a sparse FIR filter in accordance with the disclosure. A sparse FIR filter may be generally characterized by the following equation:

$$y[n] = \sum_{i=-u}^{u} w_i x[n+s_i]$$

where x[n] is an input signal, y[n] is an output signal, $w_i$ is the $i^{th}$ filter coefficient, $s_i$ is the distance for the sparse input signal, and 2u+1 is the number of filter taps. It will be understood that when $s_i=i$, the sparse FIR filter becomes a traditional dense FIR filter.

In the exemplary embodiment shown in FIG. 4, the sparse FIR filter is a 5-tap vertical sparse FIR filter. With reference to an input signal containing a pixel 415 of interest, the 5-tap vertical sparse filter uses pixels that are not abutting the pixel 415. In this embodiment, the sparse FIR filter operates over a span of 17 pixels of which only 5 pixels 405, 410, 415, 420, and 425 are used for averaging. In other words, the sparse FIR filter can be viewed as executing a sampling operation on input pixels by using a sampling period of 4 pixels. Pixels 405, 410, 420, and 425 can be loosely termed as "non-adjacent neighboring pixels" of the pixel 415.

The sparse FIR filter can produce a filtered signal output that is comparable in quality to a prior art 29-tap dense filter. Furthermore, the cost of the sparse FIR filter is significantly lower than that of a prior art dense filter. The lower cost can be attributed in part to a smaller quantity of hardware and a lower processing cost that associated with the fewer filter taps (5 taps) in contrast to the larger number of filter taps utilized in the prior art dense filter (for example, 29 filter taps). The smaller quantity of hardware may include a smaller quantity of buffers, adders, and multipliers, for example.

In various exemplary implementations in accordance with the disclosure, symmetric filter coefficients with equal weights may be used. The averaging action of the sparse FIR filtering can include actions such as summing a number of pixels followed by dividing the summing result by the number of pixels in order to obtain an averaging result. For example, 5 pixels may be first summed together, followed by dividing by 5 in order to obtain an average pixel value. Such mathematical operations may be executed by using a divider, and accordingly fixed-point filter coefficients can be selected to be efficient from a hardware calculation point of view. In some cases, it may be advantageous to set the distance between two sampling pixels to be equal. In some example implementations that are associated with high definition (HD) video signal processing, a sparse FIR filter may employ a certain number of spans (for example, 29 spans) may be adequate. However, in other cases, a larger number of spans (for example, 49 spans) may be used. However, it can be understood that increasing the number of spans may not necessarily result in an increase in cost, as long as the number of taps is a fixed number, such as 5 for example. In one example implementation, the number of taps of the sparse FIR filter may be set to 5, and the weight (coefficient) of each tap may be set to 0.2. In other embodiments a different number of taps and coefficients may be used.

The sparse FIR filter described above provides various advantages over prior art dense filters in terms of reduce banding artifacts in images. However, indiscriminate application of the sparse FIR filter to all areas of an image can lead to an undesirable level of blurring of edges and details in certain objects of the image. As pointed out above, banding artifacts are typically found in the smooth areas of an image. Consequently, in accordance with the disclosure, a sparse FIR filter is selectively applied to only the smooth areas of an image, thereby avoiding removal of edges and other details from objects that are present in areas other than the smooth areas.

The smoothness of an area can be generally determined on the basis of pixels sampled by the sparse FIR filter. If the original pixel and its "neighbors" have similar values, the area may be designated as a smooth area and the sparse FIR filter may be applied to this original pixel. If the original pixel and its "neighbors" have very different values, this difference in values may be indicative of edges and/or texture being present in the examined area. When found to be a part of such an area, the original pixel is left unchanged. In line with the description provided above, a sparse FIR filter employing 29 filter taps may define a location of an original pixel as 0, and use neighboring pixels at locations −14, −7, 7, and 14 for example, to execute an averaging operation.

A difference value between the central original pixel and a chosen neighbor pixel can be computed in order to determine similarity between an original pixel and one or more neighboring pixels. If the absolute value of the difference is less than a specified threshold value, the two values may be deemed determined as being similar. In mathematical terms this can be expressed a follows: if $|I(j)-I(0)|<\Delta$, the neighbor has a similar value to the central pixel. In the inequality above, $I(\bullet)$ represents the value (intensity) of a pixel, $I(0)$ is the value of the original central pixel, j is the location of the neighboring pixel, $I(j)$ is the value of the neighbor, $\Delta$ is the threshold. For example, for the sparse FIR filter span of 29, j=−14, −7, 7, and 14.

An area under consideration may be deemed a smooth area when all of the neighbors have values within a threshold of the original central pixel $I(0)$, i.e. if $|I(j)-I(0)|<\Delta$ for all $j\neq 0$. The sparse FIR filter can then be applied to this smooth area by replacing the value of an original central pixel to an averaged value. If any one or more of the neighboring pixels fails to satisfy the inequality equation, the original value for the pixel is left unchanged. However, the degree of smoothness of a "smooth" area may be specified in various ways. For example, in some embodiments, it may be deemed necessary to have each and every neighboring pixel to have similar values, whereas in some other embodiments, it may be deemed acceptable to have a certain number of pixels that do not meet the similarity criterion in an examined area and yet classify this examined area as a smooth area.

Figure 5:
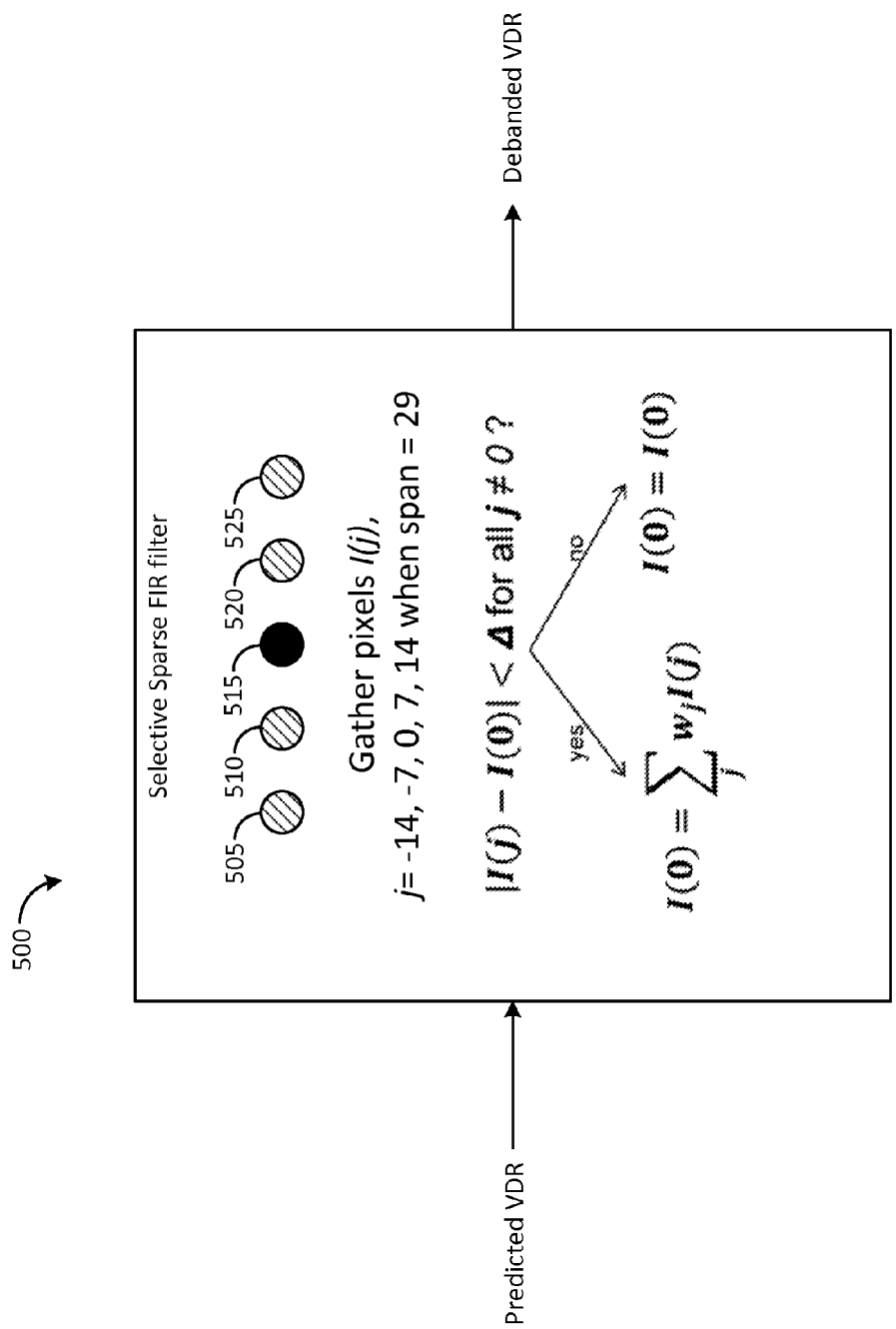
FIG. 5 shows an exemplary selective sparse FIR filter module that may be used to rectify image artifacts in accordance with the disclosure.

FIG. 5 shows an exemplary selective sparse FIR filter module 500 that may be used to rectify image artifacts in accordance with the disclosure. The input to the selective sparse FIR filter module 500 is a predicted visual dynamic range (VDR) signal. Filtering is carried out in accordance with the disclosure by using a sparse FIR filter and a pixel map (such as for example, the pixel map 400 described above). Smooth areas are first determined. This is carried out by processing each pixel in conjunction with its neighbors. For example, pixels 505, 510, 520 and 525 that are located adjacent to pixel 515 (referred to hereinafter as original pixel 515) are processed in order to determine if the area in which original pixel 515 is located corresponds to a smooth area. If the absolute difference is less than a threshold value ($\Delta$), the average of all pixels is obtained and the average is used in place of the original pixel 515. On the other hand, if the absolute difference is greater than the threshold value ($\Delta$) (indicative of an edge, for example) the original pixel 515 is left unchanged. This procedure is applied for all pixels and may be performed in both the horizontal as well as the vertical directions. The result of this procedure is a filtered signal that is indicated in FIG. 5 as a debanded VDR.

The degree of filtering applied by the sparse FIR filter is dependent on the threshold value that is selected in order to determining if a pixel is located in a smooth area and should therefore be filtered, versus a pixel that is located on an edge for example and must not be filtered. The threshold value reflects how much difference is considered tolerable in the decision process. If $\Delta$ is too small, it implies that only pixels with small difference are filtered and thus there would be few areas filtered. In other words, filtering may not be sufficient to remove the banding artifacts. If Δ is set to a large value, the filter would be applied in a big area, including the areas with sharp edges and details, which may result in blurred edges and loss of details.

Since the input to selective sparse FIR filter module 500 is the predicted VDR signal, Δ may depend on the basis of detecting difference between codewords that represent each pixel. For example, it may only be desirable to smooth within a few codewords. In areas containing an artifact, pixels usually have very similar codewords, while the values of the pixels in textured areas can be very different.

The selective sparse FIR filter module 500 may be applied to various kinds of pixels in order to rectify various types of artifacts. For example, luma-related artifacts may be rectified by addressing certain luma related aspects, while chroma-related artifacts may be rectified by addressing certain chroma related aspects. Some of these aspects are described below in more detail.

In some exemplary embodiments, a polynomial mapping may be employed by the predictor 120 (shown in FIG. 1) for predicting luma components that are present in SDR and VDR images. For example, the predictor 120 could support up to 8 pieces of piecewise $2^{nd}$-order polynomial mapping. A look-up table (LUT) can be built according to the polynomial mapping and stored in a memory (not shown) for use by the predictor 120. For example, a LUT can be built according to an 8-piece polynomial as a BL value is increased sequentially. This LUT constructs the mapping relationship between the SDR and the VDR values. In some images, the codewords of banding areas in the BL (SDR image) can be very close to each other, and typically, the codeword difference between neighboring pixels can be around 1 or 2 in the BL domain.

If it is assumed that the codeword of a pixel in the BL is b and the codeword of its neighbor is b+1, after the prediction using the LUT, the codeword in the VDR domain will be LUT(b) and LUT(b+1); and the absolute difference will be |LUT(b+1)−LUT(b)|. The LUT corresponds to a nonlinear curve, thus the absolute difference in the VDR domain is not a constant when the value b is varied. If an area is relatively smooth, it is expected that the difference between the neighboring pixels in the VDR domain will be roughly within the range of |LUT(b+1)−LUT(b)| times a small number. If a pixel is in a complex area, then the neighboring pixels in the VDR domain could be much larger than |LUT(b+1)−LUT(b)| times a small number. This relationship can provide a useful guideline to determine the threshold Δ in the VDR domain.

The differential of the LUT can be defined as the absolute difference between each of the two neighboring codewords in the following manner:

$$dLUT(b) = |LUT(b+1) - LUT(b)| \text{ for all } b=0,1,\ldots,2^{BL\_bitdepth}-2$$

where BL_bitdepth denotes the bit depth of the base layer (BL) (e.g., BL_bitdepth=8).

In some embodiments, there can be up to 8 segment (or 9 pivot points) of polynomial predictor used in the luma component, and the pivot points in the VDR domain are $\{s_0, s_1, \ldots, s_M\}$ where M is the number of pivot points. Since the mapping, in this example, is $2^{nd}$-order polynomial and the polynomial coefficients of each segment may not be the same, the dLUT(b) can also be partitioned into multiple segments according to the pivot points used in the luma predictor. A specific threshold for the pixel with value LUT(b) in the VDR domain can also be selected according to which segment it is in. An empirical result shows that if the maximal dLUT(b) multiplied by a factor t is picked as the threshold Δ (LUT(b)) for each segment, it is possible to obtain a good tradeoff between the removal of banding and the preservation of texture/edge details.

$$\Delta(LUT(b)) = t \cdot \max_{s_k \leq LUT(b) < s_{k+1}} \{|LUT(b+1) - LUT(b)|\}$$

In some embodiments, the factor t=2, which can be interpreted as a normal codeword difference at the boundary of false contouring areas.

In some embodiments, 2-piece and 8-piece prediction are supported. The 2-piece prediction allows 2 pieces, and the point at the boundary of the segments is called the pivot point. The pivot point is selected to minimize the prediction error. It is not fixed for each frame. After mapping, if the predicted value is greater than 1, the value is clipped to 1 (actually it is clipped to $(2^{EL\_bit\_depth}-1)/2^{EL\_bit\_depth}$, since the codeword is from 0 to $2^{EL\_bit\_depth}-1$). Therefore, the LUT is actually divided into 3 segments when the clipping occurs.

Figure 6:
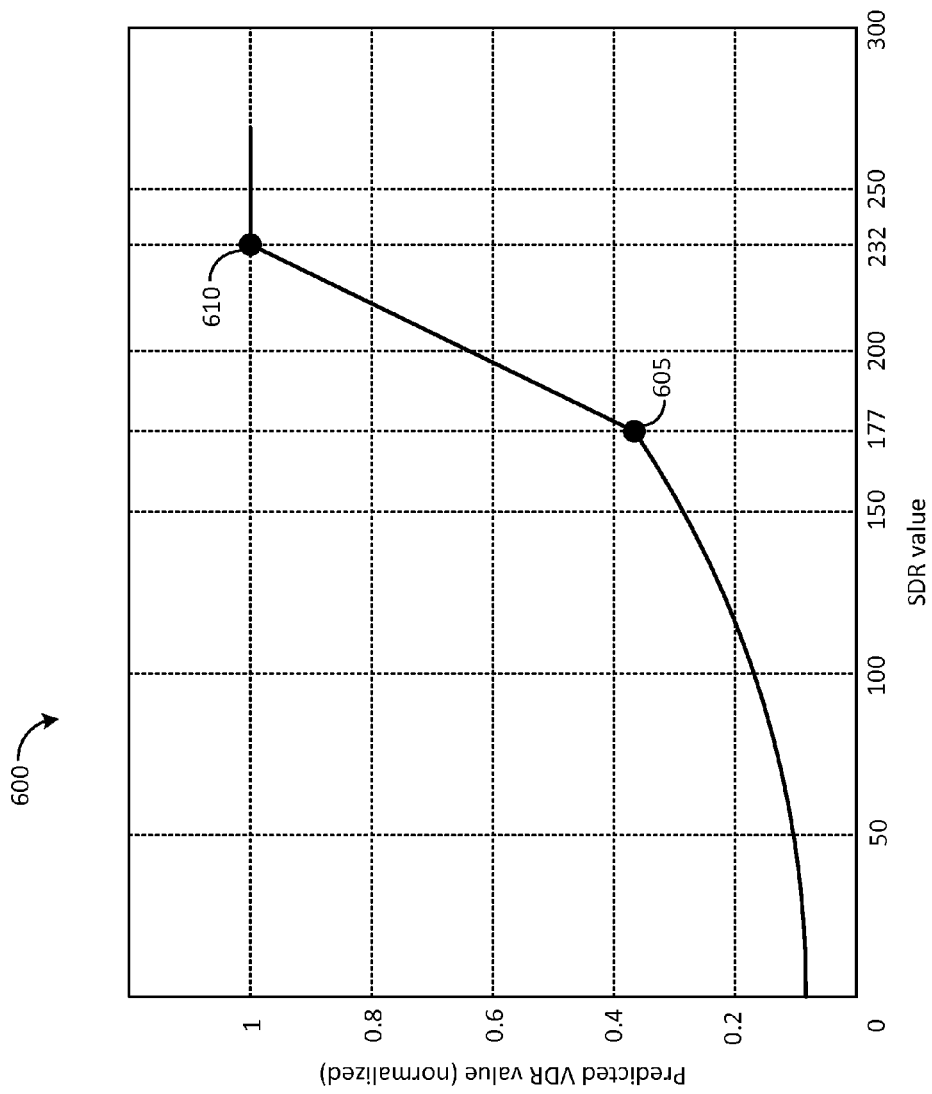
FIG. 6 depicts an example of SDR to VDR mapping using a 2-segment predictor according to an exemplary embodiment.

FIG. 6 illustrates an example of an SDR-to-VDR predictor using two segments. A pivot point 605 is located at SDR=177 and a clipping point 610 located at SDR=232. When the SDR value is greater than 232, all the mapped SDR values are clipped to 1. Consequently, all the differentials are zero. Information pertaining to the pivot point 605 may be conveyed from an encoder to a decoder in the form of metadata.

Figure 7:
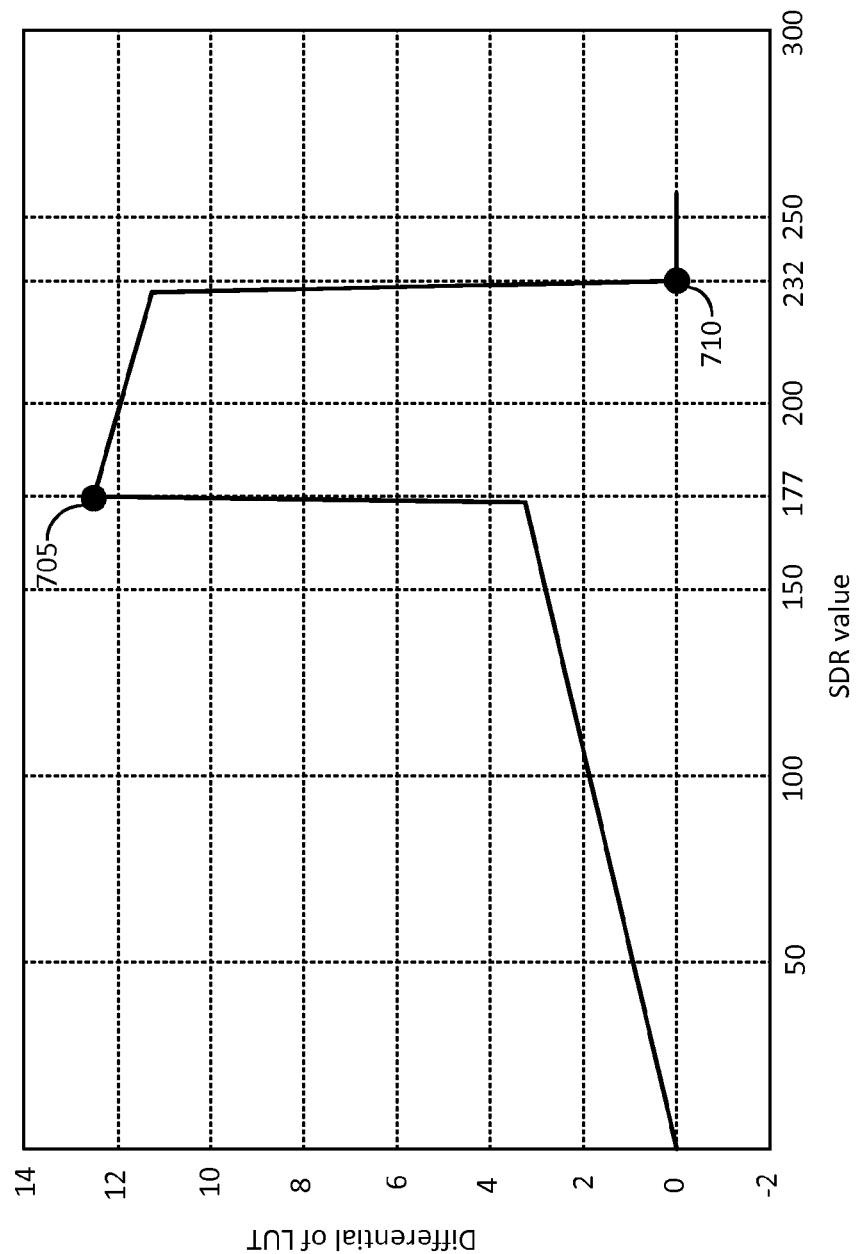
FIG. 7 illustrates the LUT differentials for neighbor SDR values predicted using the 2-segment prediction example of FIG. 6.

FIG. 7 depicts the corresponding differential LUT values |LUT(b+1)−LUT(b)| for an example video frame. The pivot point 705 in this example is again located at SDR=177, and the clipping point 710 is located at SDR=232. Here again, when the SDR value is greater than or equal to 232, all the mapped VDR values are clipped to 1 and the differentials are 0. It can also be understood from the mapping that the differential values indicate three distinct segments in the image.

As mentioned before, different threshold detection values can be selected thus resulting in various number of segments. In this example, the selected threshold results in three segments. $\Delta_1$ is for the first segment (0≤SDR value<177), $\Delta_2$ for the second segment (178≤SDR value<232), and $\Delta_3$ for the third segment (232≤SDR value<255).

If the factor t (in equation shown above) is set to 2, it entails that at most 2 codewords are considered tolerable if the original value is in this segment. In some implementations, a factor of t=2 may provide good results when the span is 29; and the factor of t=3 may provide good results when the span is 49. For the example above, if the factor is t=3, the threshold of each segment is:

$$\Delta = \begin{cases} 0.0096 & \text{if } 0 \leq SDR \text{ value} < 177 (0 \leq VDR \text{ value} < 0.3576) \\ 0.0372 & \text{else if } 177 \leq SDR \text{ value} < 232 \ (0.3576 \leq VDR \text{ value} < 0.9999) \\ 0 & \text{otherwise } (VDR \text{ value} = 0.9999) \end{cases}$$

Figure 8:
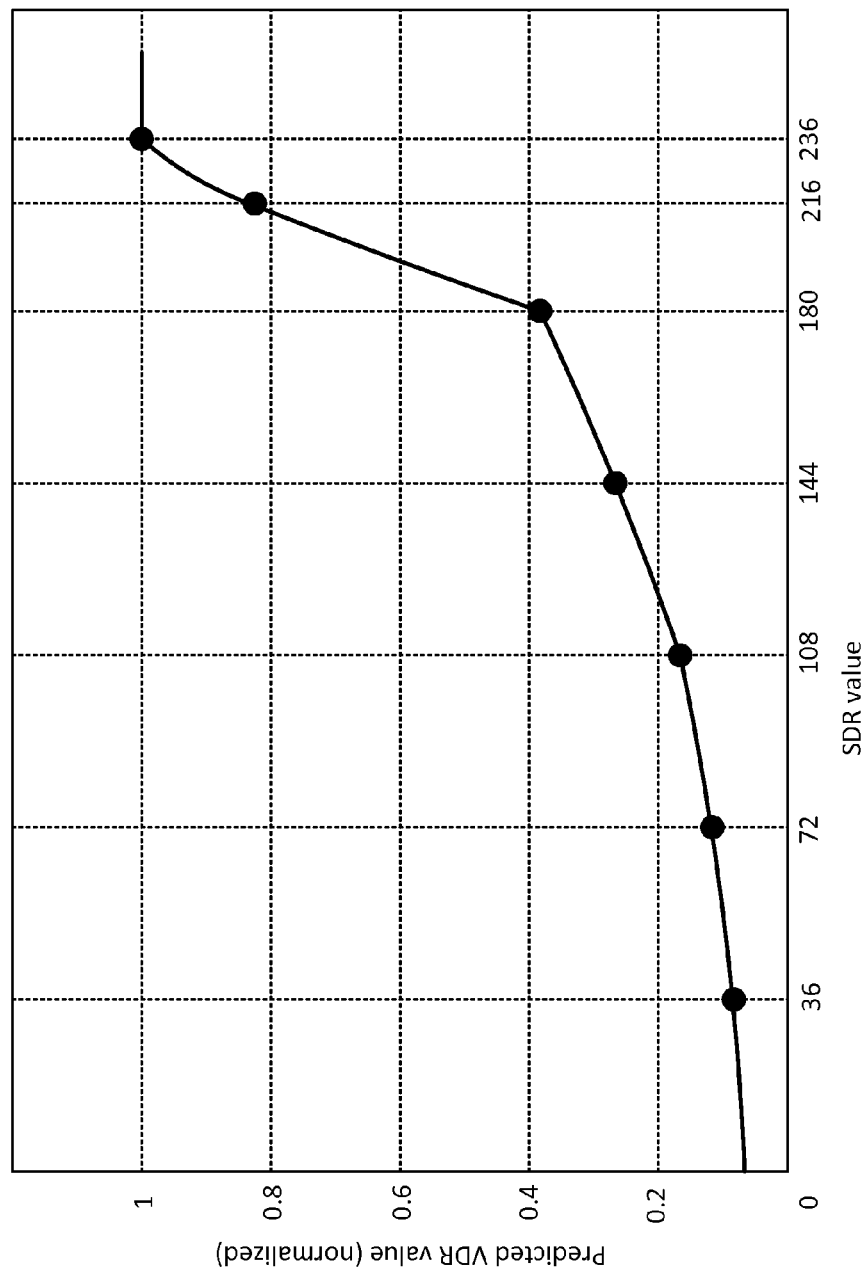
FIG. 8 depicts an example of SDR to VDR mapping using an 8-segment predictor according to an exemplary embodiment.

In another example, as shown in FIG. 8, for 8-segment prediction there can be 8 pieces at most. In this case there are several more pivot points than in the 2-piece case. Then there would be at most 9 segments for the threshold computation as the last part may be clipped to 1 after mapping. The threshold can also be set to the absolute value of the maximal differential of the LUT multiplied by a chosen factor. The pivot points in this case correspond to SDR values of 36, 72, 108, 144, 180, and 216. The clipping point corresponds to a SDR value of 236. If the factor is 3, the threshold of each segment is:

$$\Delta = \begin{cases} 0.0037 & \text{if } 0 \leq SDR \text{ value} < 36 \ (0 \leq VDR \text{ value} < 0.0907) \\ 0.0037 & \text{else if } 36 \leq SDR \text{ value} < 72 \ (0.0907 \leq VDR \text{ value} < 0.132) \\ 0.0049 & \text{else if } 72 \leq SDR \text{ value} < 108 \ (0.132 \leq VDR \text{ value} < 0.182) \\ 0.0074 & \text{else if } 108 \leq SDR \text{ value} < 144 \ (0.182 \leq VDR \text{ value} < .02508) \\ 0.0138 & \text{else if } 144 \leq SDR \text{ value} < 180 \ (0.2508 \leq VDR \text{ value} < 0.3843) \\ 0.0425 & \text{else if } 180 \leq SDR \text{ value} < 216 \ (0.3843 \leq VDR \text{ value} < 0.8239) \\ 0.0268 & \text{else if } 216 \leq SDR \text{ value} < 236 \ (0.8239 \leq VDR \text{ value} < 0.9999) \\ 0 & \text{otherwise } (VDR \text{ value} = 0.9999) \end{cases}$$

Figure 9:
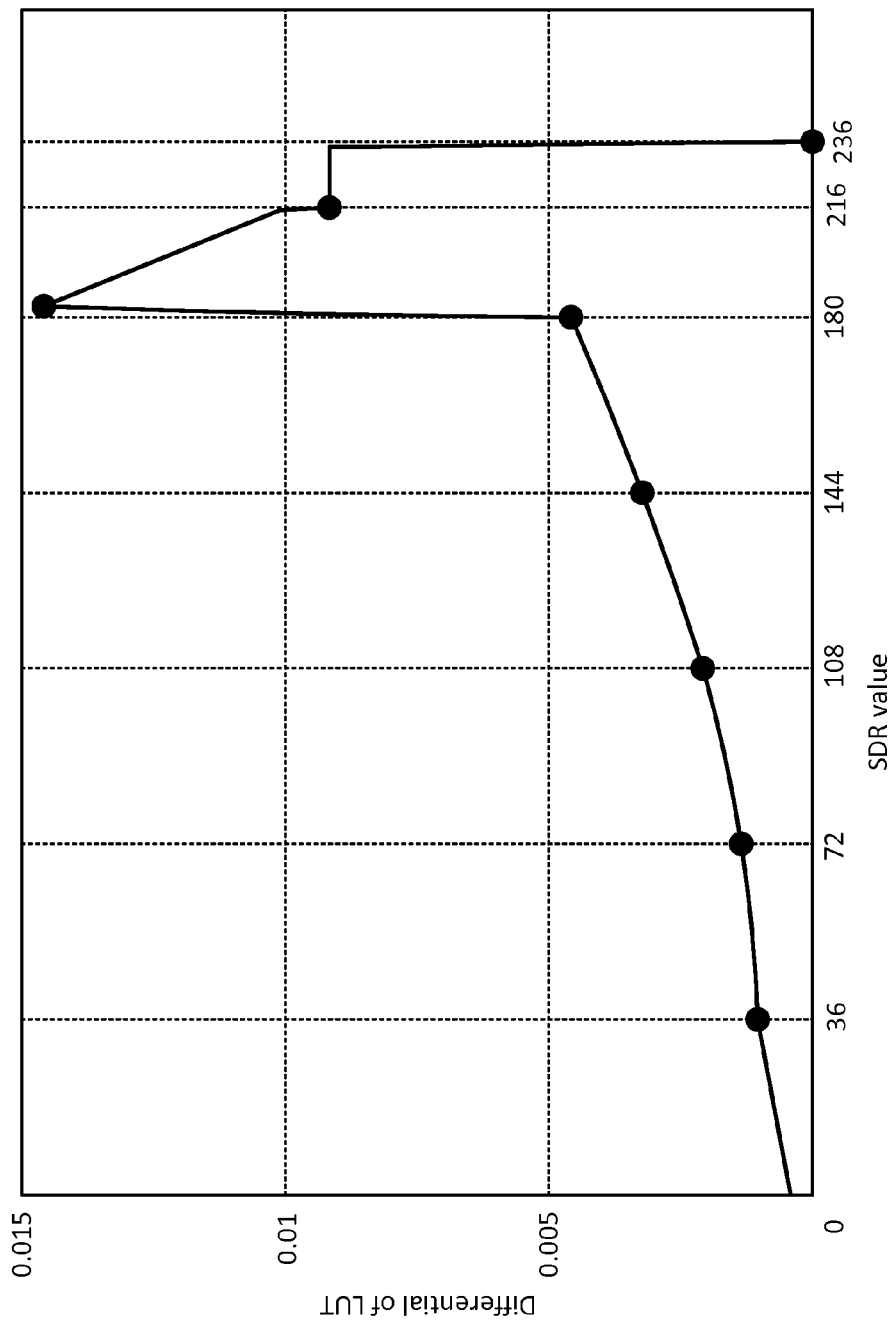
FIG. 9 illustrates the LUT differentials for neighboring SDR values predicted using the 8-segment prediction example of FIG. 8.

FIG. 9 shows a plot of differential values of a LUT versus SDR values for an example 8-piece prediction. Coding artifacts such as blocky artifacts may be reduced or eliminated by application of the selective spares FIR filter as described herein.

Figure 10:
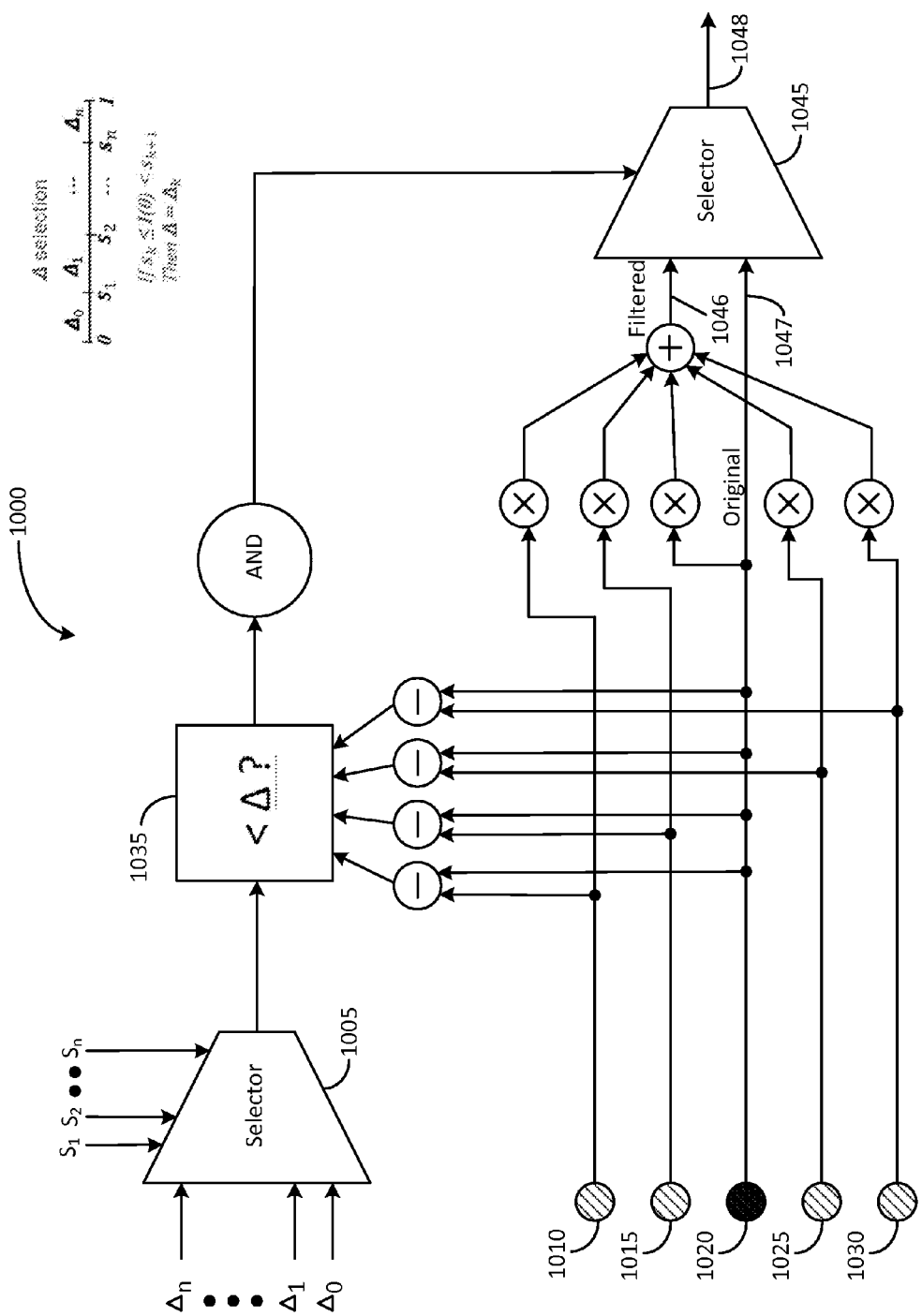
FIG. 10 shows an exemplary system for rectifying image artifacts in accordance with the disclosure.

FIG. 10 shows an exemplary system 1000 for rectifying image artifacts in accordance with the disclosure. System 1000 incorporates a selective sparse FIR filter with adaptive thresholds. Processing of an image may be initiated by first selecting a desired threshold value ($\Delta$). This can be carried out by using selector 1005 to select one of "n" threshold values. Neighboring pixels (for example, 4 neighboring pixels 1010, 1015, 1025 and 1030) are used to determine absolute difference values with respect to an original pixel 1020 (predicted VDR value) in comparison block 1035. The differences are calculated through the minus operators 1001. In FIG. 10, four minus operators 1001 are depicted, however a different number may be used depending on the number of pixels under examination. In some embodiments, the minus operators 1001 comprise two operations: a minus operation and an absolute operation. By taking the absolute value, the actual relative distance between pixel values is calculated.

If all the absolute difference values are less than the threshold value, the output of comparison block 1035 indicates that the original pixel 102 should be replaced by a filtered value (average value). This is carried out via a control signal carried on control line 1040 to selector 1045, which correspondingly selects the filtered pixel value on line 1046 and provides this on output line 1048. On the other hand, if the absolute difference values are more than the threshold value (thus indicative of an edge, for example), the output of comparison block 1035 indicates that the original pixel 102 should be selected by selector 1045. This action is executed via a different control signal carried on control line 1040 to selector 1045, which correspondingly selects the original pixel value on line 1047 and provides this on output line 1048. In some embodiments, a coefficient of 0.2 (1/number_of_taps) may not be achievable. Consequently, in such cases, other values may be used. Hardware compatible coefficients may be used for this purpose. For example, in some embodiments, the coefficient of the original pixel 1020 can be set to 52/256=0.203125, and the other coefficients to 51/256=0.19921875, if 8 bits are allowed for each coefficient.

As far as chroma-related filtering using the selective sparse FIR filter in accordance with the disclosure, is concerned, a cross-channel higher order prediction model may be used in place of a segment-based prediction model. The lack of pivot points may cause generation of a LUT difficult. Luma-based filtering does reduce chroma-related artifacts. However, for more effectively remedying artifacts it may be advantageous to carry out selective sparse FIR filtering by addressing both luma as well as chroma related artifacts. More particularly, typically, chroma planes can also have banding artifacts, but debanding only the luma cannot remove all of the banding, no matter what parameters are set for the filter.

In some embodiments, the prediction for chroma planes may be based on cross-channel higher order prediction, multi-channel multiple regression (MMR), as described in U.S. Pat. No. 8,811,490, which is incorporated herein by reference in its entirety. The mapping is three-to-three, from the 3 channels (Y, U, V) of SDR to the 3 channels (Y, U, V) of VDR. It may be impractical to build a LUT for the prediction, as the LUT would have $256^3$ codewords. There is also no pivot point for chroma so the strategy for luma may not work for chroma. To deal with this problem, the present disclosure describes two methods for chroma debanding: chroma debanding by selecting a threshold, and chroma debanding by using the luma filtering map.

To apply the same selective sparse filter described above (with respect to luma) to chroma, a threshold $\Delta$ has to be selected. Since there is no LUT or pivot point for chroma, in one example implementation, the threshold values used for the luma filtering applications may be used for the chroma filtering applications as well. Typically, the difference between codewords of chroma is usually smaller than that of luma. Therefore, in some implementations, a minimal nonzero threshold value used for luma filtering may be used for chroma filtering as well. For example, various threshold values used of luma for a specific cinema frame can be defined as follows:

$$\Delta = \begin{cases} 0.0096 & \text{if } 0 \leq SDR \text{ value} < 177 (0 \leq VDR \text{ value} < 0.3576) \\ 0.0372 & \text{else if } 177 \leq SDR \text{ value} < 232 \ (0.3576 \leq VDR \text{ value} < 0.9999) \\ 0 & \text{otherwise } (VDR \text{ value} = 0.9999) \end{cases}$$

$\Delta_1$=0.0064 is the minimal nonzero threshold of luma, therefore chroma's threshold value can be set to $\Delta_1$=0.0064. In this example, a global $\Delta$ can be used for the whole chroma plane and the selective sparse FIR filter described above in the present disclosure can be applied. In some embodiments, the selective sparse FIR filter may be applied differently to each pixel depending on the two chroma planes (Cb and Cr).

In contrast to carrying out chroma filtering by selecting a threshold value based on luma filtering, in an alternative approach, filtering maps of luma that have been generated (vertical filtering map and horizontal filtering map) as a result of luma filtering may be used for chroma filtering. In some embodiments, it can be assumed that luma and chroma have the same smooth area, so it is possible to apply filtering to the same area by using the luma filtering maps which have been already generated. For Y:U:V=4:2:0, the chroma planes have a quarter size of the luma plane (downsampled by 2 in the vertical and horizontal direction). Therefore, it may be advantageous in some implementations, to downsample the luma's filtering maps before applying these maps to chroma filtering.

The downsampling strategy may be carried out as follows: for each 2×2 block in luma, if all of the pixels are filtered, then the corresponding chroma pixel should also be filtered; if any of the 4 luma pixels is not filtered, the corresponding chroma pixel should not be filtered.

Figure 11:
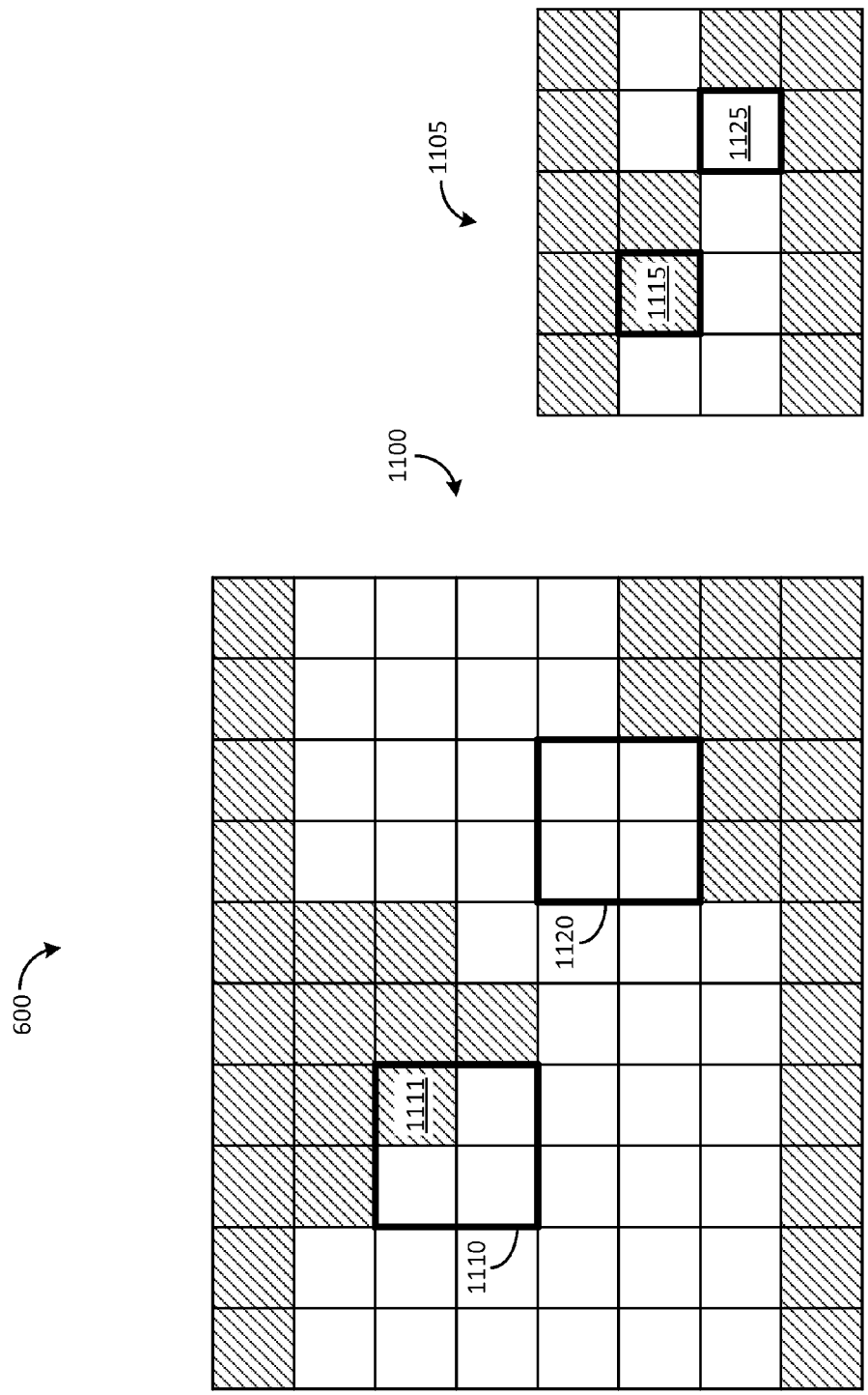
FIG. 11 shows an exemplary filtering map of the luma and the chroma portions of an image.

FIG. 11 shows a luma filtering map 1100 and a corresponding chroma filtering map 1105 that can be generated from the luma filtering map 1100. Each block in either map represents one pixel. The blocks that are denoted by hatched lines are unfiltered pixels, while the remaining blocks are filtered pixels. For the 2×2 block 1110 in the luma filtering map 1100, of the four blocks denoted by the boundary 1110, one pixel 1111 is not filtered. Consequently, a corresponding block 1115 in the chroma filter map 1105 is not filtered as well. For the 2×2 block 1120 in the luma filtering map 1100, all the blocks denoted by the boundary 1120 are filtered. Consequently, a corresponding block 1125 in the chroma filter map 1105 is filtered.

The chroma planes can then be filtered based on the chroma filtering map 1105. If the chroma filtering map 1105 indicates that a particular pixel should be filtered, that chroma pixel will be filtered by, for example, by using a selective sparse FIR filter; otherwise the chroma pixel will be left unchanged.

It may be pertinent to point out that in view of the two alternative filtering approaches described above, using a minimal nonzero luma threshold provides an advantage in that each of the chroma planes can be processed individually, i.e. the three channels can be processed in parallel. It is desirable that a proper threshold value Δ be selected in order to avoid undesirable color shifts or other color related aberrations in the filtered image. Furthermore, it would be advantageous if artifacts that are present in the luma layer are located in the same locations in the chroma layers as well. Such an overlap can avoid undesirable color related issues that may be encountered in the filtered image.

Debanding by the selective sparse FIR filter usually gives good results compared to no debanding or other procedures such as noise injection. However, debanding can sometimes result in some artifacts in the image. One possible artifact is the introduction of new false ringing into a filtered image. In certain cases, false ringing may be located in bright areas, because the differential of the LUT is usually large in bright areas (Δ is large). False ringing can occur when the pixels located near edges are averaged. More particularly, in some case and edge may be located between two smooth regions. As described above, during sparse FIR filtering, 5 neighboring pixels may be selected. If the 5 neighboring pixels have relatively similar values, and the threshold Δ of a bright area can be large, all the neighbors pixels may pass the test. However, the first pixel or the fifth pixel may be located in a transition area and may be termed an outlier. Though the outlier may satisfy the threshold Δ test, the value of this first/fifth pixel is sufficiently different from those of the other pixels and the averaging operation of the selective sparse FIR filter can lead to a false ringing artifact in the filtered image. The false ringing issue may be addressed by expanding the non-filtering area. Towards this end, the filtering map can be eroded by a small degree and the filtered values located in the eroded area can be replaced by the original values.

Figure 12:
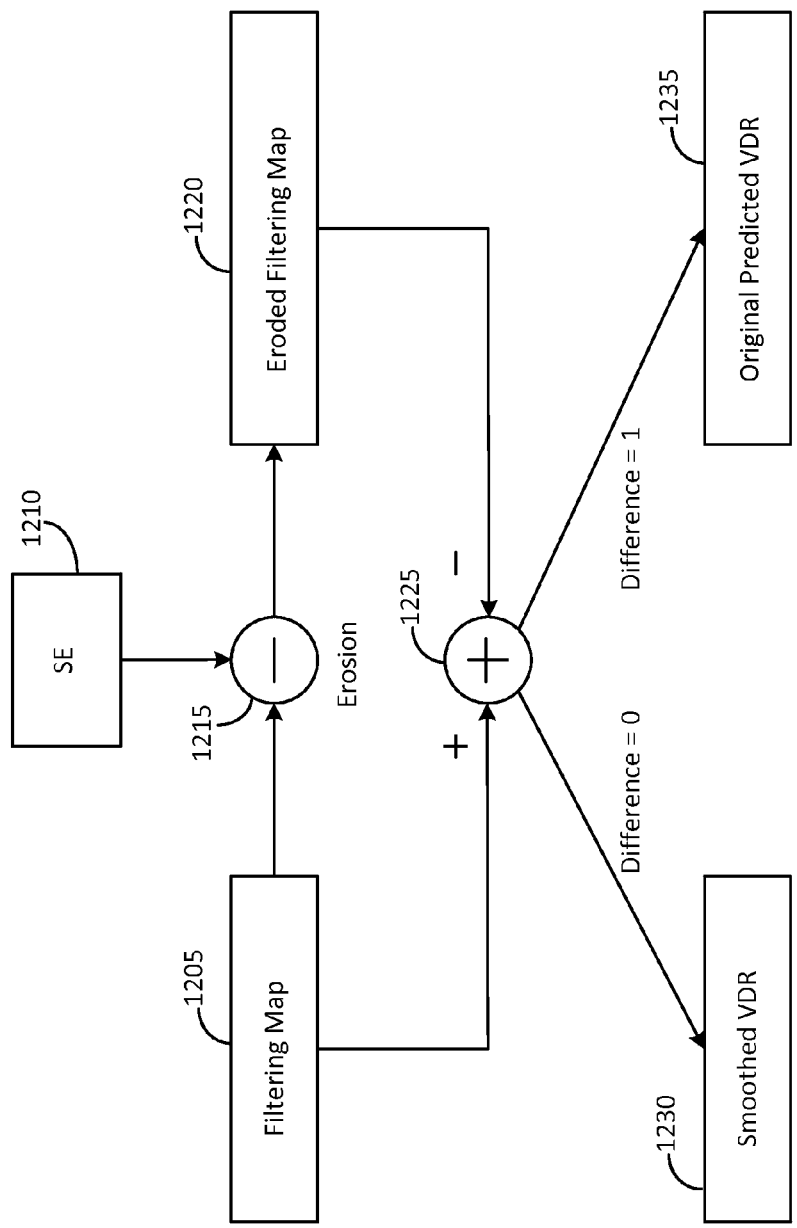
FIG. 12 shows an exemplary flowchart for erosion of a filtering map in order to address false ringing issues.

FIG. 12 shows an exemplary flowchart 1200 for erosion of a filtering map in order to address false ringing issues. A binary filtering map 1205 is obtained after a selective sparse FIR filtering procedure in accordance with the disclosure. In the binary filtering map 1205, a "1" is indicative of a filtered pixel and a "0" is indicative of an unfiltered pixel (i.e., an original pixel). An erosion operation 1215 is applied to the binary filtering map 1205 by using a structuring element (SE) 1210. SE 1210 will be described below in further detail. Erosion operation 1215 produces an eroded filtering map 1220. A difference operation 1225 is executed to obtain difference values between the binary filtering map 1205 and the eroded filtering map 1220. A "0" is indicative of an unchanged pixel value after erosion and this "0" value is used to retain a smoothed VDR value 1230. On the other hand, a "1" value is indicative of an eroded area in the image. Hence, the pixel value is reset to the original predicted VDR value 1235. Execution of the flowchart 1200 results in a filtering area being eroded to some extent, and a corresponding expansion of an unfiltered area of the image.

Figure 13:
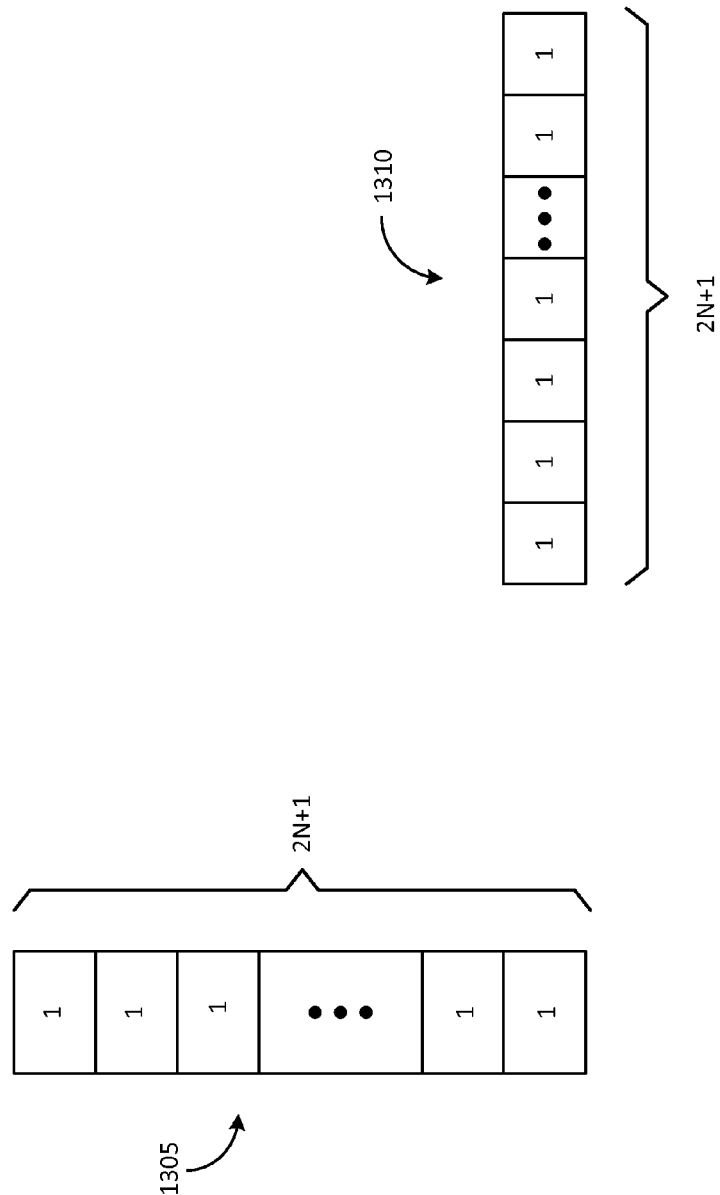
FIG. 13 shows the structuring element for the vertical filtering map and the filtering map.

Attention is now drawn to FIG. 13, which shows an exemplary structuring element (SE) for a vertical filtering map 1305 and another exemplary SE for a horizontal filtering map 1310. In this example, each of the two SEs is a 1D SE. The length of each SE may be indicated as 2N+1. In some exemplary embodiments, it may be advantageous to set N=3 or 5. Other values can be used in other embodiments.

Each of the two SEs may be stored in a 2N+1 sized buffer. The cost of using such buffers may be reduced by modifying the selective sparse FIR filter in accordance with the disclosure to an edge selective sparse FIR filter that is to execute an erosion procedure in accordance with the disclosure. In this context, attention is drawn to FIG. 14, which shows an exemplary edge aware selective sparse FIR filter operation 1400 that may be used to rectify image artifacts in accordance with the disclosure. In this example implementation, two additional pixels 1405 and 1410 are included in the extremities of the pixels that are used in the decision making procedure on whether to apply the filtering operation. However, if the filtering operation is applied, the two additional pixels 1405 and 1410 are not included in the averaging operation. In this example, original pixel 1425 now has 6 neighboring pixels. The additional pixels allow for probing for the presence of an edge in an examined portion of an image. Additional pixel 1405 is located a probe_len distance away from the original farthest neighbor pixel 1415 and additional pixel 1410 is located a probe_len distance away from the original farthest neighbor pixel 1420.

If all the differences between neighboring pixels are less than the threshold Δ, a sparse filtering FIR operation is applied to the central pixel. However, if either pixels 1405 or pixel 1410 fails the threshold test, then the filtering operation is not applied. For example, pixel 1405 may pass the threshold Δ test but pixel 1410 may fail the threshold Δ test because pixel 1410 is an outlier that is located on one side of an edge in a different area (having a different luma/chroma value) than the smooth area in which pixels 1405, 1415, 1430, 1425, 1435, and 1420 are located. In this example, the filtering operation is not applied.

In a second example, pixel 1410 may pass the threshold Δ test but pixel 1405 may fail the threshold Δ test because pixel 1405 is an outlier that is located on one side of an edge in a different area than the smooth area in which pixels 1415, 1430, 1425, 1435, 1420 and 1410 are located. In this example, the filtering operation is not applied.

In yet another implementation, both pixel 1405 and pixel 1410 may fail the threshold Δ test because both pixel 1405 and pixel 1410 are outlier pixels located in areas other than the smooth area in which pixels 1415, 1430, 1425, 1435 and 1420 are located. In this example, the filtering operation is also not applied.

Figure 14:
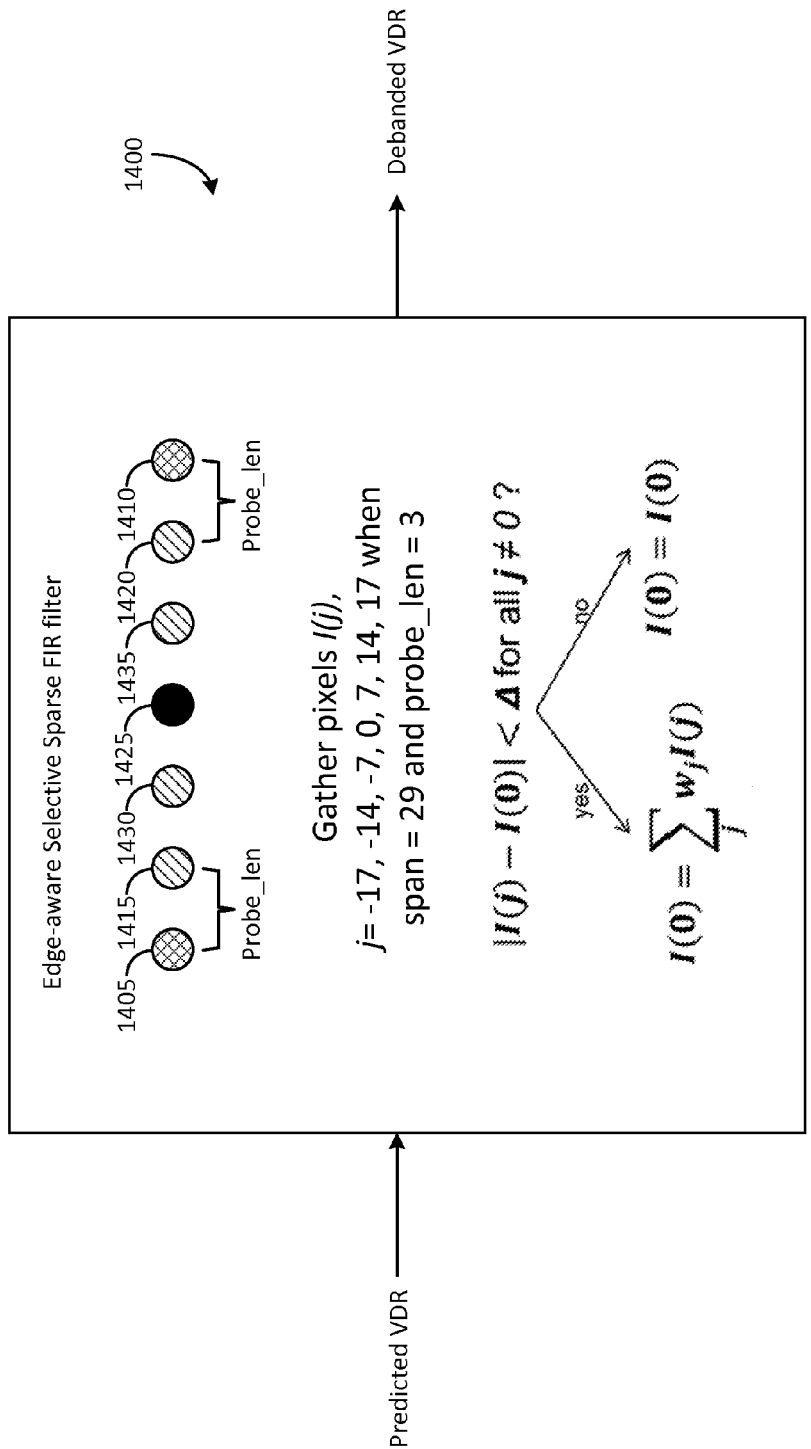
FIG. 14 shows an exemplary edge aware selective sparse FIR filter operation that may be used to rectify image artifacts in accordance with the disclosure.
Figure 15:
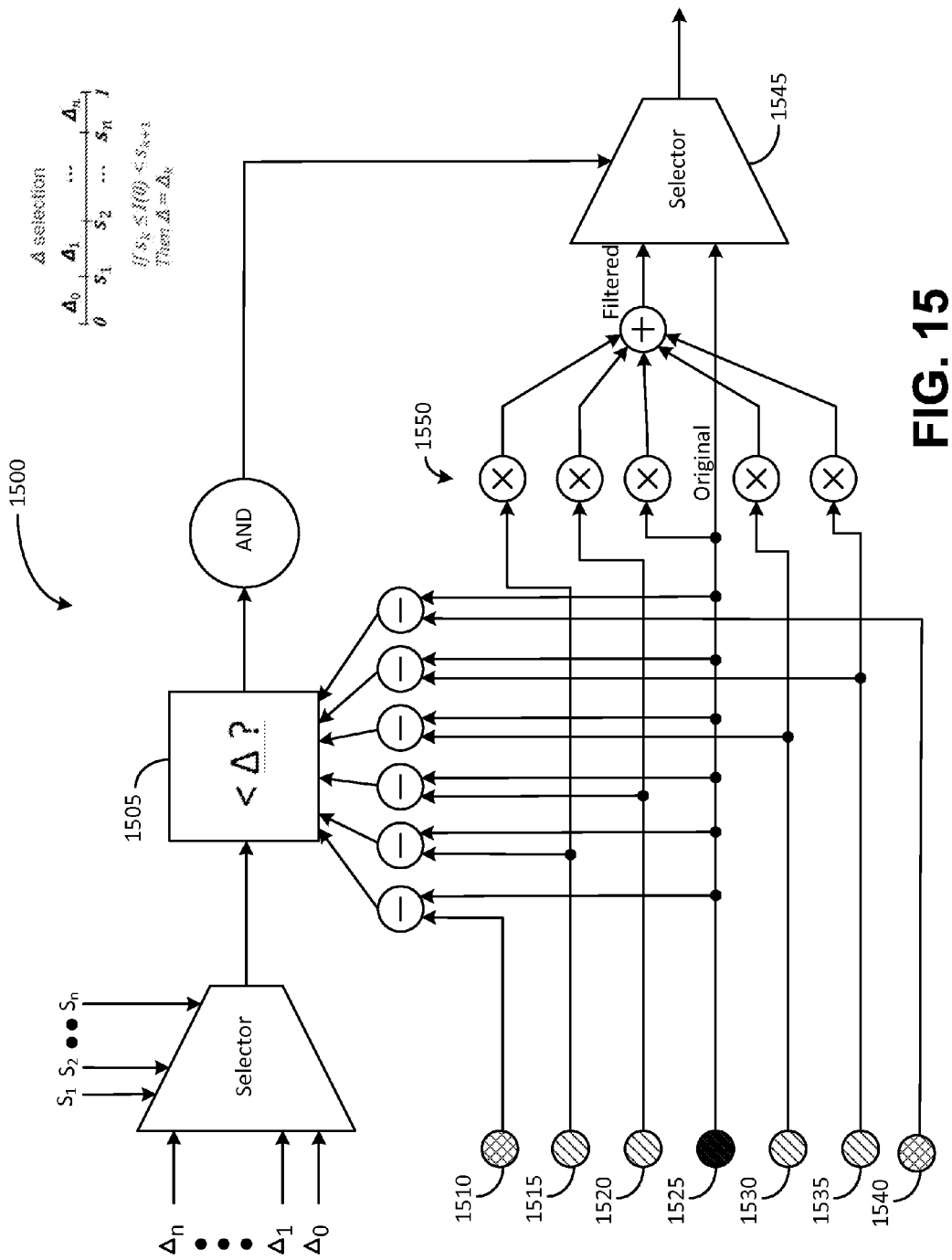
FIG. 15 shows an exemplary system for executing the edge aware selective sparse filtering operation shown in FIG. 14.

Attention is now drawn to FIG. 15, which shows an exemplary system 1500 for executing the edge aware selective sparse filtering operation indicated in FIG. 14. In contrast to the 4 neighboring pixels of the original pixel that are used in comparison block 1035 of system 1000 (shown in FIG. 10), the comparison block 1505 in system 1500 uses 6 neighboring pixels 1510, 1515, 1520, 1530, 1535 and 1540 of the original pixel 1525. However, various other elements can remain unchanged with respect to system 1000 because only 5 pixels are operated upon in system 1500 as well. The differences are calculated through the minus operators 1501. In FIG. 15, six minus operators 1501 are depicted; however, a different number may be used depending on the number of pixels under examination. In some embodiments, the minus operators 1501 comprise two operations: a minus operation and an absolute operation. By taking the absolute value, the actual relative distance between pixel values is calculated.

As far as chroma-related filtering using the edge aware selective sparse FIR filter in accordance with the disclosure, is concerned, a cross-channel higher order prediction model may be used. As disclosed above, the lack of pivot points may cause generation of a LUT difficult. Luma-based filtering does reduce chroma-related artifacts. However, for more effectively remedying artifacts it may be advantageous to carry out selective sparse FIR filtering by addressing both luma as well as chroma related artifacts. More particularly, typically, chroma planes can also have banding artifacts, but debanding only the luma cannot remove all of the banding, no matter what parameters are set for the filter.

To apply the same edge aware selective sparse filter described above (with respect to luma) to chroma, a threshold $\Delta$ has to be selected. Since there is no LUT or pivot point for chroma, in one example implementation, the threshold values used for the luma filtering applications may be used for the chroma filtering applications as well. Typically, the difference between codewords of chroma is usually smaller than that of luma. Therefore, in some implementations, a minimal nonzero threshold value used for luma filtering may be used for chroma filtering as well.

The various exemplary embodiments disclosed above relate to sparse FIR filtering, selective sparse FIR filtering, and edge aware sparse FIR filtering. Each of these embodiments are executable by propagating some types of metadata from an encoder to a decoder. Certain aspect pertaining to such metadata will now be addressed in further detail. In some embodiments, for each color channel, the propagated metadata can include one or more of the following: Enable/Disable debanding filter flag, span of the sparse filter, one or more thresholds set for the luma component (where the number of thresholds is typically equal to the number of segments), letterbox coordinates, and one or more probe_len values. When the filtering pertains to chroma components, the number of thresholds is 1, and the propagated metadata can include one of two options. In the first option, a factor that can be used for determining the threshold value $\Delta$ is transmitted. The factor can be used in the following manner: $\Delta$=differential of LUT×factor. In this case, the LUT and the differential of LUT can be constructed, and can be used to find a maximal value in each segment. This option reduces the transmitted metadata overhead at the expense of additional computation at the decoder end. In the second option, the transmitted metadata can include all calculated threshold values $\{\Delta_i\}$. Empirical combinations of some parameters have indicated that the following aspects may be advantageous: if the span of the sparse FIR filter is 29, the factor to determine $\Delta$ can be 2; if the span of the sparse filter is 49, the factor to determine $\Delta$ can be 3.

In some embodiments, the filtering map may not be needed to be sent as metadata, because the filtering decision can be made from the predicted VDR that is reconstructed by the decoder. The chroma debanding method may be executing by selecting the $\Delta$ for chroma, as the computational cost is lower, and the performance is good.

Figure 16:
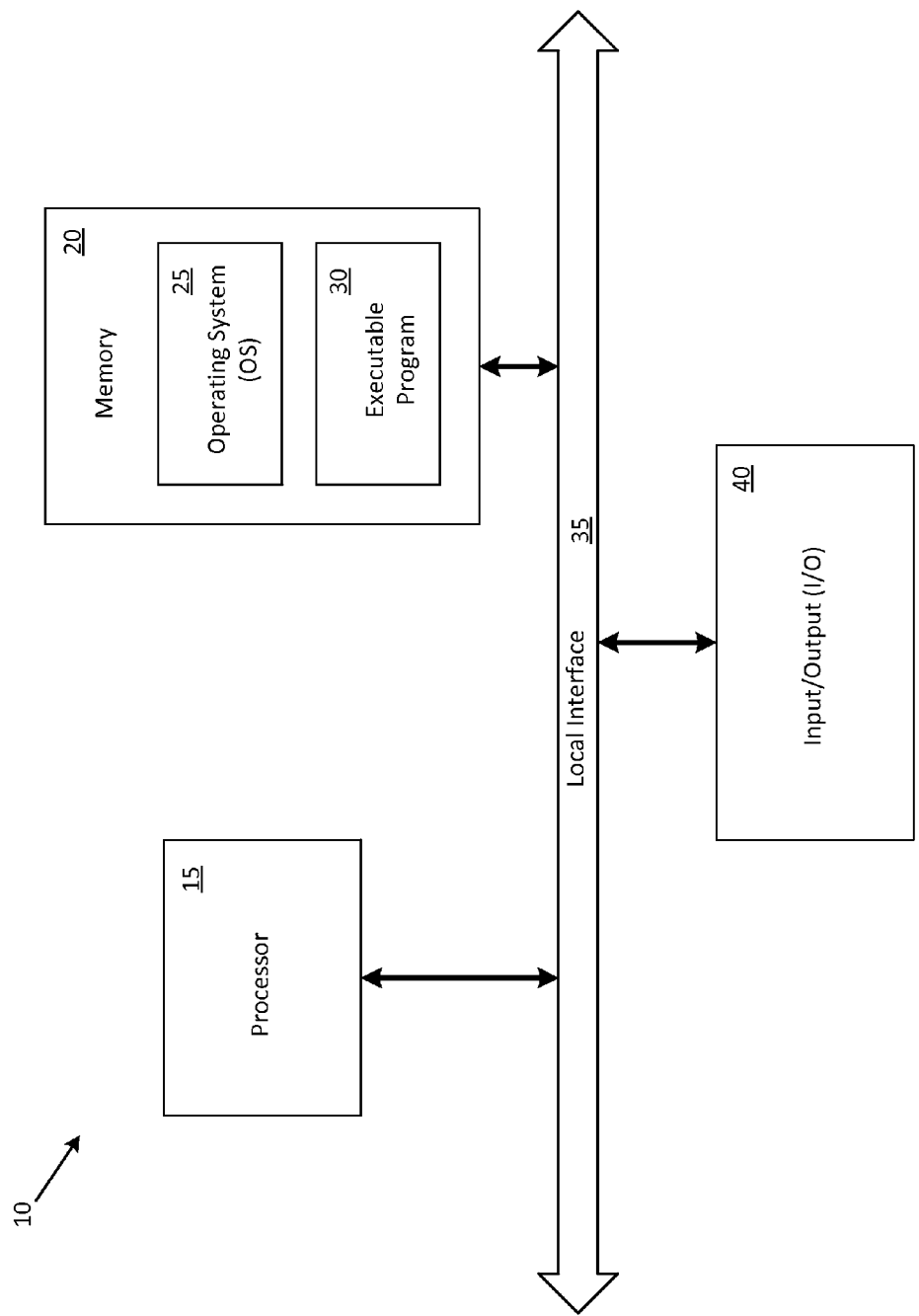
FIG. 16 shows a hardware system that may be used for executing various filtering procedures in accordance with the disclosure.

FIG. 16 shows a possible hardware system 10 that may be used for executing various filtering procedures in accordance with the disclosure. Hardware system 10 can include a processor 15, a memory bank 20, a local interface bus 35 and one or more Input/Output devices 40. The processor 15 may execute one or more instructions related to the implementation of the embodiments of the present disclosure, and as provided by the Operating System 25 based on some executable program 30 stored in the memory 20. These instructions are carried to the processor 15 via the local interface 35 and as dictated by some data interface protocol specific to the local interface and the processor 15. It should be noted that the local interface 35 is a symbolic representation of several elements such as controllers, buffers (caches), drivers, repeaters and receivers that are generally directed at providing address, control, and/or data connections between multiple elements of a processor based system. In some embodiments the processor 15) may be fitted with some local memory (cache) where it can store some of the instructions to be performed for some added execution speed. Execution of the instructions by the processor may require usage of some input/output device 40, such as inputting data from a file stored on a hard disk, inputting commands from a keyboard, inputting data and/or commands from a touchscreen, outputting data to a display, or outputting data to a USB flash drive. In some embodiments, the operating system 25 facilitates these tasks by being the central element to gathering the various data and instructions required for the execution of the program and provide these to the microprocessor. In some embodiments the operating system may not exist, and all the tasks are under direct control of the processor 15), although the basic architecture of the system 10 will remain the same as depicted in FIG. 16. In some embodiments a plurality of processors may be used in a parallel configuration for added execution speed. In such a case, the executable program may be specifically tailored to a parallel execution. Also, in some embodiments the processor 15 may execute part of the implementation of the embodiments of the present disclosure, and some other part may be implemented using dedicated hardware/firmware placed at an Input/Output location accessible by the system 10 via local interface 35. The system 10 may include a plurality of executable programs 30, wherein each may run independently or in combination with one another.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure are described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A method to reduce visual artifacts, the method comprising:
   providing, by a computer, a first image with a first dynamic range;
   predicting, by a computer, using a predictor and the first image, a second image with a second dynamic range, wherein the second dynamic range is higher than the first dynamic range;
   calculating, by a computer, parameters for a debanding filter based on the predictor and based on calculating, for at least one pixel of the second image, a weighted average of neighboring pixels, wherein the neighboring pixels are in a vertical and/or horizontal direction to the at least one pixel and are not immediately adjacent to other neighboring pixels or to the at least one pixel; and
   applying, by a computer, the debanding filter to the second image to generate an output image with the second dynamic range,
   wherein the calculating, by a computer, parameters for the debanding filter comprises:
      calculating differences between the at least one pixel of the second image and all of the neighboring pixels; and
      if the differences are below or equal to a threshold value for all of the neighboring pixels, applying, by a computer, the debanding filter, and the threshold value is calculated with $$\Delta(LUT(b)) = t \cdot \max_{s_k \leq LUT(b) < s_{k+1}} \{|LUT(b+1) - LUT(b)|\}$$

wherein LUT is a look up table to convert from the first image to the second image, b is a codeword for a pixel of the first image, LUT(b) is a codeword for a pixel of the second image corresponding to the pixel of first image, t is a numerical factor, and s is a pivot point.

2. The method of claim 1, wherein the second image has a higher bit depth than the first image.

3. The method of claim 1, further comprising:
   providing, by a computer, an original image with a dynamic range higher than the first dynamic range;
   calculating, by a computer, a difference between the original image and the output image;
   encoding the difference as an enhancement layer signal.

4. The method of claim 1, further comprising calculating, by a computer, metadata based on parameters of the debanding filter.

5. The method of claim 1, wherein the first image is a frame in a video.

6. The method of claim 1, wherein the second image has a 12 bit depth and the first image has an 8 bit depth.

7. The method of claim 1, wherein the applying, by a computer, the debanding filter is carried out on smooth areas of the second image.

8. The method of claim 1, wherein the applying, by a computer, the debanding filter is carried out on a luma component.

9. The method of claim 1, wherein the applying, by a computer, the debanding filter is carried out on a chroma component.

10. The method of claim 1, wherein the calculating a weighted average of neighboring pixels comprises calculating $$y[n] = \sum_{i=-u}^{u} w_i x[n + s_i]$$

where x[n] is an input signal, y[n] is an output signal, $w_i$ is a $i^{th}$ filter coefficient, $s_i$ is a distance between neighboring pixels, and 2u is a total number of neighboring pixels.

11. The method of claim 10, wherein the total number of neighboring pixels is 4.

12. The method of claim 10, wherein the distance between neighboring pixels is between 5 and 12.

13. The method of claim 1, wherein the calculating, by a computer, parameters for the debanding filter comprises calculating smooth areas of the second image and applying a sparse filter to the smooth areas.

14. The method of claim 13, wherein the calculating smooth areas comprises detecting an edge between nearby regions of the second image.

15. The method of claim 1, wherein the numerical factor t is 2.

16. The method of claim 1, further comprising selecting a minimal nonzero threshold value of the luma component for use in applying, by a computer, the debanding filter to a chroma component.

17. The method of claim 1, further comprising applying, by a computer, the debanding filter to a chroma component based on filtering maps of the luma component.

18. The method of claim 17, further comprising downsampling the filtering maps before applying, by a computer, the debanding filter to a chroma component.

19. The method of claim 1, further comprising:
calculating differences between the at least one pixel of the second image and at least two additional neighboring pixels, the at least two additional neighboring pixels each having a distance from the at least one pixel of the second image greater than a distance between the at least one pixel of the second range image and the other neighboring pixels; and
if the differences are below or equal to a threshold value for all of the neighboring pixels including the at least two additional neighboring pixels, applying, by a computer, the debanding filter.

20. A method to reduce visual artifacts, the method comprising:
providing, by a computer, an enhancement layer signal;
providing, by a computer, a first image with a first dynamic range;
predicting, by a computer, using a predictor and the first image, a second image with a second dynamic range, wherein the second dynamic range is higher than the first dynamic range;
calculating, by a computer, parameters for a debanding filter based on the predictor and based on calculating, for at least one pixel of the second image, a weighted average of neighboring pixels, wherein the neighboring pixels are in a vertical and/or horizontal direction to the at least one pixel and are not immediately adjacent to other neighboring pixels or to the at least one pixel;
applying, by a computer, the debanding filter to the second image to generate an output image with the second dynamic range; and
calculating, by a computer, a sum of the output image and the enhancement layer signal, thereby obtaining a decoded image with the second dynamic range,
wherein the calculating, by a computer, parameters for the debanding filter comprises:
calculating differences between the at least one pixel of the second image and all of the neighboring pixels; and
if the differences are below or equal to a threshold value for all of the neighboring pixels, applying, by a computer, the debanding filter, and the threshold value is calculated with $$\Delta(LUT(b)) = t \cdot \max_{s_k \leq LUT(b) < s_{k+1}} \{|LUT(b+1) - LUT(b)|\}$$

wherein LUT is a look up table to convert from the first image to the second image, b is a codeword for a pixel of the first image, LUT(b) is a codeword for a pixel of the second image corresponding to the pixel of first image, t is a numerical factor, and s is a pivot point.

21. The method of claim 20, wherein the second image has a higher bit depth than the first image.

* * * * *